United States Patent
Eifrig et al.

(10) Patent No.: US 6,748,020 B1
(45) Date of Patent: Jun. 8, 2004

(54) TRANSCODER-MULTIPLEXER (TRANSMUX) SOFTWARE ARCHITECTURE

(75) Inventors: Robert O. Eifrig, San Diego, CA (US); Fan Ling, Santa Clara, CA (US); Xuemin Chen, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 736 days.

(21) Appl. No.: 09/696,533

(22) Filed: Oct. 25, 2000

(51) Int. Cl.[7] .............................. H04N 7/12; G06K 9/36
(52) U.S. Cl. ................ 375/240.26; 382/236; 348/423.1
(58) Field of Search ................ 375/240.26, 240.25, 375/240.29, 240.03, 240.12, 240.04, 240.01; 348/458, 459, 385.1, 405.1, 423.1; 370/535, 473; 382/234, 235

(56) References Cited

U.S. PATENT DOCUMENTS

| | | | |
|---|---|---|---|
| 5,805,224 A | * 9/1998 | Keesman et al. | 375/240.04 |
| 5,870,146 A | 2/1999 | Zhu | |
| 6,094,457 A | 7/2000 | Linzer et al. | |
| 6,275,536 B1 | * 8/2001 | Chen et al. | 375/240.25 |
| 6,310,915 B1 | * 10/2001 | Wells et al. | 375/240.03 |
| 6,434,197 B1 | * 8/2002 | Wang et al. | 375/240.29 |
| 6,570,922 B1 | * 5/2003 | Wang et al. | 375/240.12 |
| 6,643,327 B1 | * 11/2003 | Wang | 375/240.12 |

FOREIGN PATENT DOCUMENTS

| | | |
|---|---|---|
| EP | 0 572 766 | 12/1993 |
| EP | 1 001 582 | 5/2000 |
| WO | WO 97/39584 | 10/1997 |
| WO | WO 97/40626 | 10/1997 |
| WO | WO 98/27720 | 6/1998 |
| WO | WO 00/07374 | 2/2000 |

OTHER PUBLICATIONS

Media Accelerated Processor for Consumer Appliances, MAPCA2000™ Data Sheet, DS#00006 Feb. 5, 2000, Equator Technologies, Inc.

* cited by examiner

Primary Examiner—Gims Philippe
(74) Attorney, Agent, or Firm—Barry R. Lipsitz; Douglas M. McAllister

(57) ABSTRACT

A digital video transcoder-multiplexer (transmux) architecture that is fully software-implemented. The transmux includes transcoder processing elements (TPEs) that may use a very long instruction word (VLIW) media processor for performing transcoding, and de-assembly and re-assembly at a transport stream level, and a co-processor for providing de-assembly and re-assembly at an elementary stream level. The processors operate in parallel, at least in part, to optimize throughput and provide processing load balancing. A transmux architecture that is fully software implemented is provided to allow upgrading to handle new functions, fix hardware or software problems, test new processes, adapt to changing customer requirements, and so forth.

27 Claims, 14 Drawing Sheets

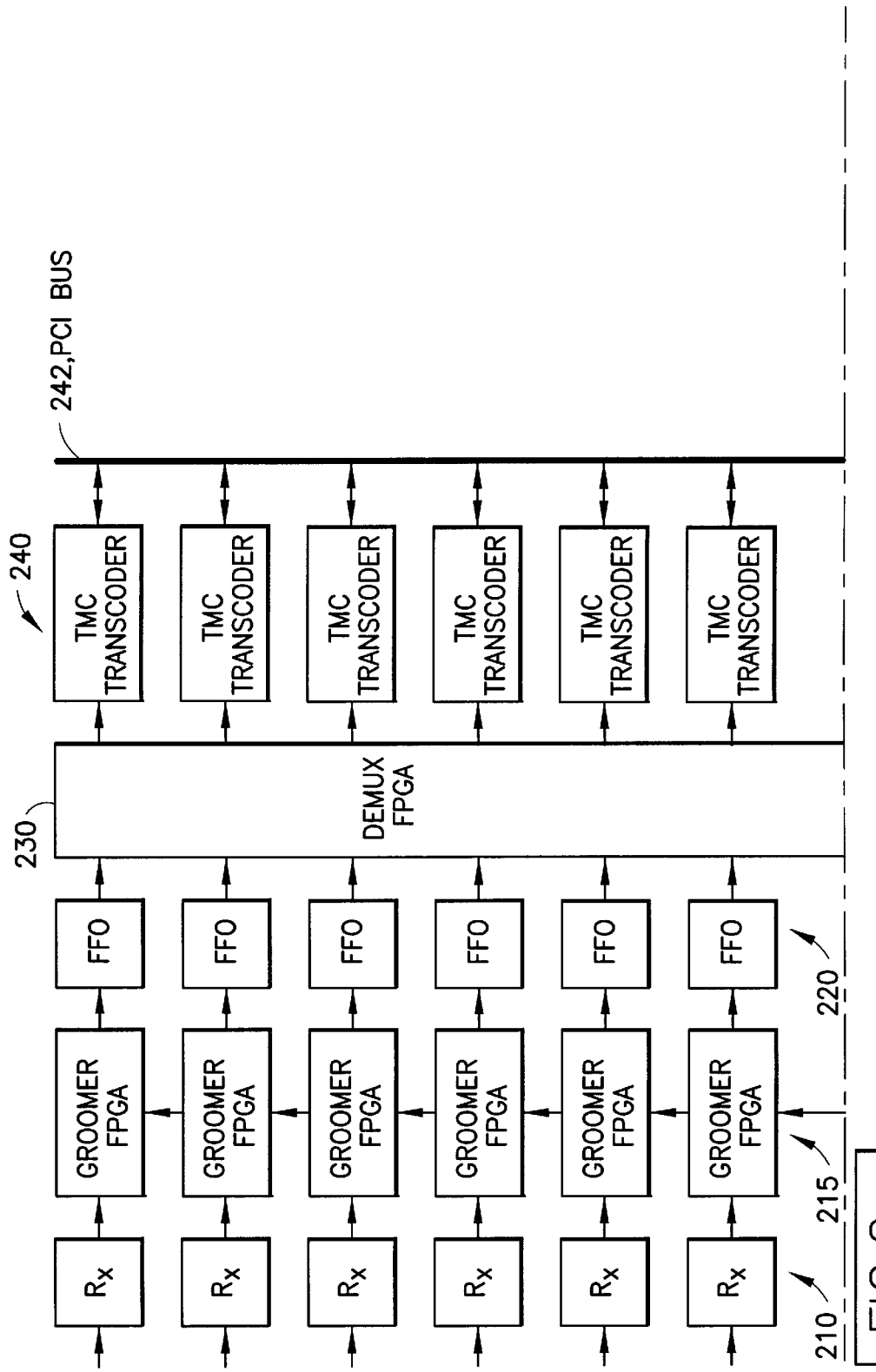

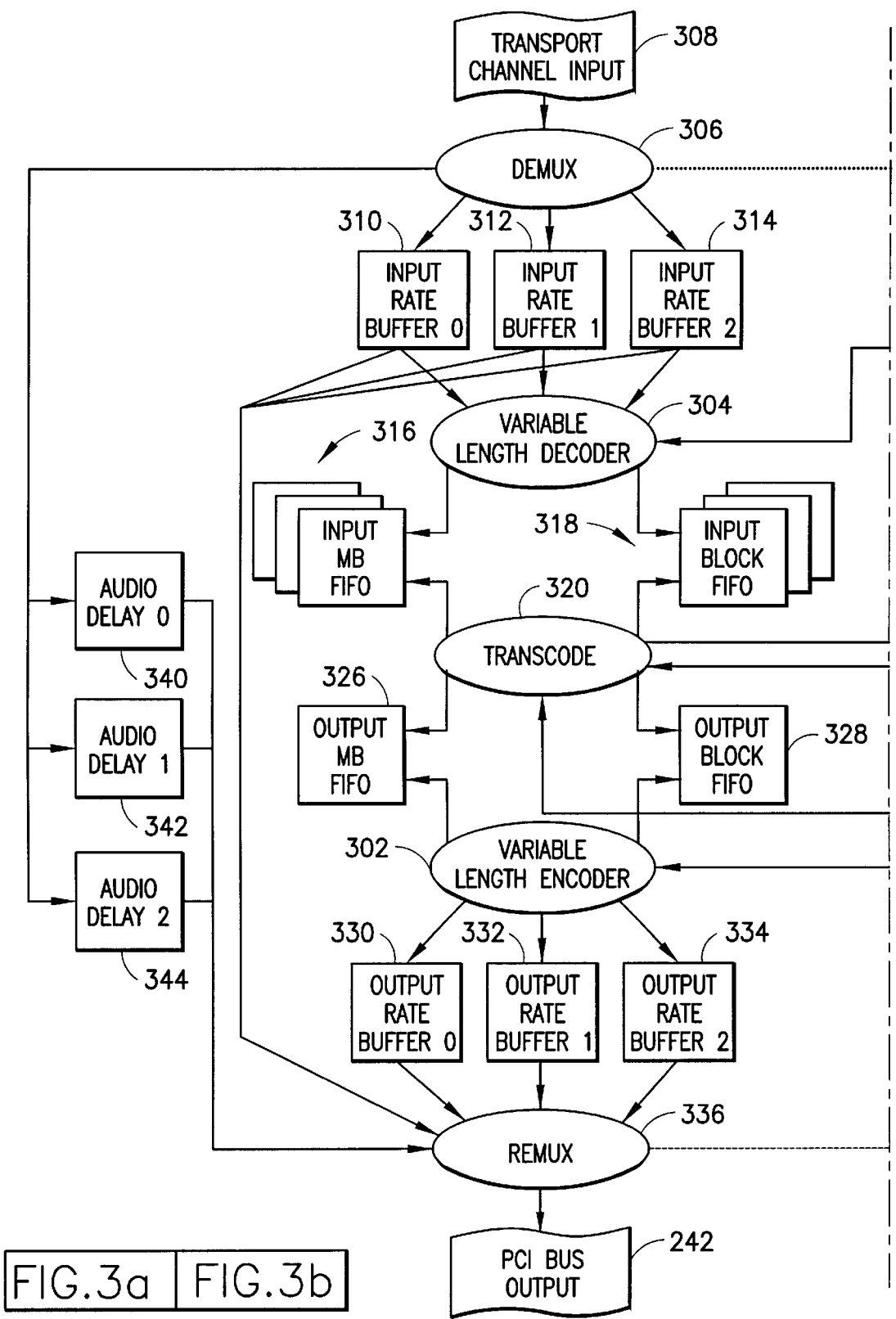

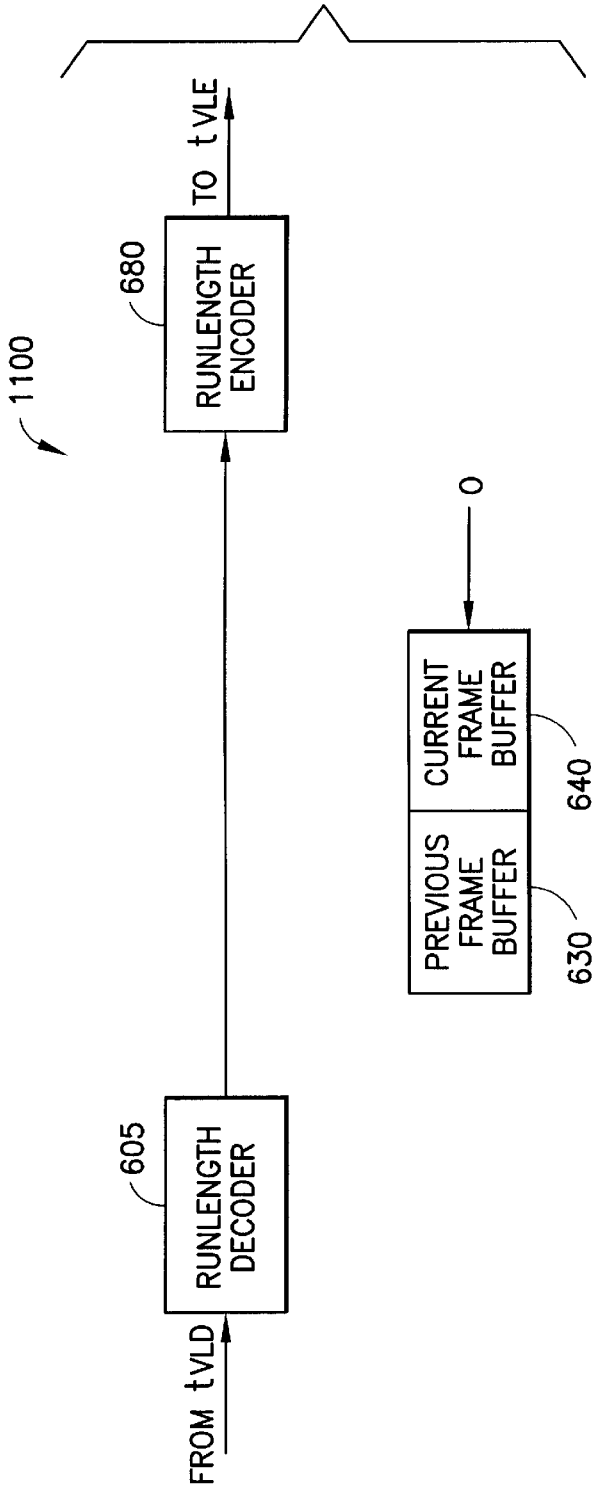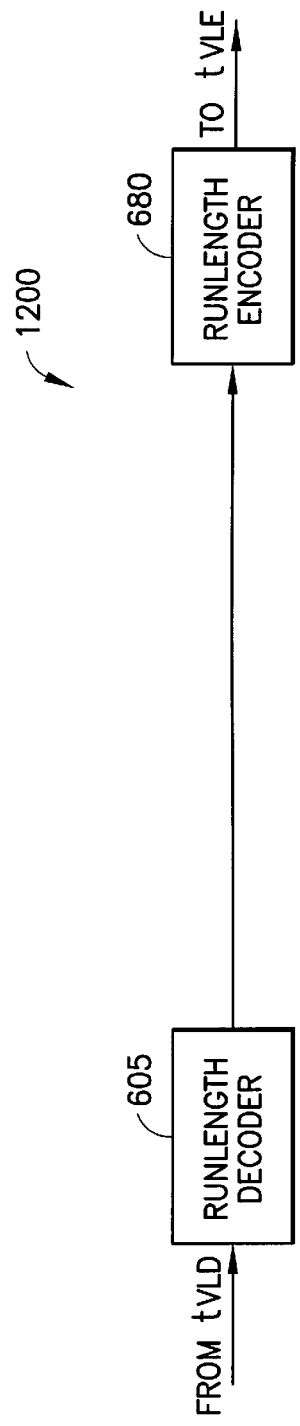

TRANSCODER-MULTIPLEXER (TRANSMUX) SOFTWARE ARCHITECTURE

BACKGROUND OF THE INVENTION

The present invention relates to a digital video transcoder architecture.

The following acronyms and terms are used:
AC—Alternating Current (DCT coefficient)
ALU—Arithmetic Logic Unit
B—Bidirectionally-predictive coded (MPEG)
Back.—Backward (MPEG)
BSP—Bitstream Processor
CBP—Coded Block Pattern (MPEG)
CBR—Constant Bit Rate
Chan.—Channel
CPU—Central Processing Unit
D$—Data cache
DC—Direct Current (DCT coefficient)
DCT—Discrete Cosine Transform
DMA—Direct Memory Access
DPCM—Differential Pulse Code Modulation
DPRAM—Dual Port RAM
DS—Data Streamer
DTS—Decode Time Stamp
FIFO—First-In, First-Out
FIR—Finite Impulse Response
FPGA—Field-Programmable Gate Array
Fwd.—Forward (MPEG)
H/V—Horizontal/Vertical
HW—Hardware
I—Intra-coded (MPEG) or Integer
I$—Instruction cache
I/F—Intermediate Frequency
I2C—IIC—Inter-integrated circuit (a serial bus standard)
I2S—IIS—Inter-IC sound (a 3-wire digital stereo PCM audio interconnect)
iBlk—Input block FIFO
IDCT—Inverse DCT
IEC—International Electro-mechanical Commission
IFG—Integer, Floating point & Graphics (as in IFG-ALU); an Equator acronym
IG—Integer, Graphics unit
iMB—Input macroblock FIFO
Info.—Information
Int.—Interface
iRB—Input rate buffer
ISR—interrupt service routine
ITU—International Telecommunications Union
JTAG—Joint Test Action Group (IEEE 1149.1 protocol)
KB—Kilobyte
LRU—least recently used (a cache line replacement algorithm)
MAP—Media Accelerated Processor (Equator)
MB—Megabyte or Macroblock
MC—Motion Compensation
MTS—MPEG Transport Stream
MUX—Multiplexer
NC—Non-coherent Connect
NOP—No Operation
NTSC—National Television Standards Committee
oBlk—Output block FIFO
oMB—Output macroblock FIFO
oRB—Output rate buffer
P—Predictive-Coded (MPEG)
PCR—Program Clock Reference (MPEG)
PES—Packetized Elementary Stream (MPEG)
Pic.—Picture
PID—Packet Identifier
PTS—Presentation Time Stamp (MPEG)
QL—Quantization Level
RAM—Random Access Memory
RAMDAC—RAM Digital-to-Analog Converter
Ref.—Reference
Reg.—Register
RGB—Red Green Blue
RISC—Reduced Instruction Set Computer
RL—Run Length (or run-level pair)
ROM—Read-Only Memory
RTOS—Real-Time Operating System
Rx—Receiver
SAV—Start of Active Video
SC—Start Code
SDRAM—Synchronous Dynamic Random Access Memory
SGRAM—Synchronous Graphics Random Access Memory
SIMD—Single Instruction, Multiple Data
Svc.—Service
SW—Software
T1—A US telephony digital line standard with a data rate of 1.544 Mbps
TCI—Transport Channel Input
TLB—Translation Lookaside Buffer (part of MMU)
TMC—Transcoder Multiplexer Core
TPE—Transcoder Processing Element
T-STD—Transport System Target Decoder
tVLD—Transcoder VLD
tVLE—Transcoder VLE
Tx—Transmitter
VBV—Video Buffer Verifier (MPEG)
VLD—Variable-Length Decoding
VLE—Variable-Length Encoding
VLIW—Very Long Instruction Word The transmission of digital video data, e.g., via broadband communication systems such as cable television or satellite television networks has become increasingly popular. Source video sequences can be pre-encoded at any rate, which may be a constant bit rate (CBR) or variable bit rate (VBR), to form pre-compressed or live bitstreams. For many applications, however, the pre-compressed bitstreams must correspond with only specific allowable, or otherwise desirable, formats and bit rates. Accordingly, a transcoder is used to change the bit rate, format or other characteristics of the video data prior to communicating it, e.g., to a set-top box and/or some intermediate point in a network.

A number of transcoders are often used in a statistical multiplexer that receives a number of compressed bitstreams, decompresses the bitstreams (at least partially), then recompresses them at a different rate by allocating a quantization parameter based on some statistical property of the bitstreams such as picture complexity.

The bitstreams are typically compressed according to a known video coding standard, such as MPEG.

A transmux refers to a combination of multiple single-service video transcoders and a statistical multiplexer that dynamically sets the video bit rate. Usually, this is done to perceptually equalize the quality of the video services within a statmux group, i.e., allocate more bits to services containing a difficult-to-compress video, and fewer bits to services containing easier-to-compress video.

However, the development of a transmux architecture must address various needs. In particular, it would be desirable to provide transmux architecture that is fully software implemented. This provides great flexibility by allowing the transmux functions to be changed in the field (e.g., at cable television headends and the like) by only changing the software rather than the hardware. The architecture is also suitable for use in computer networks such as the Internet.

This is advantageous since it allows upgrading of transmuxes to handle new functions, fix hardware or software problems ("bugs"), test new processes, adapt to changing customer requirements, and so forth. These tasks are all easier with a "soft" (software-based) transmux.

Moreover, savings in design time and expenses can result.

The transmux should provide a good computational efficiency and allow a relatively small physical size (footprint).

The transmux should be implementable using a readily-available media processor, such as a VLIW media processor.

The transmux should perform full transcoding, including keeping track of frame-to-frame requantization errors.

The transmux should provide scheduling of multiple transcoding threads (including buffer management, processor management, and the like) with combinations of both transcoded video PIDs and pass-thru data/audio services on a single processor without the use of a RTOS.

The transmux should use a load balancing algorithm, specific to the transcoding task, for keeping a VLIW processor and co-processor from waiting on each other, and to obtain high levels of computational throughput.

The transmux should provide decomposition of a transcoding algorithm into components which run on a VLIW processor and a co-processors subject to co-processor memory constraints, instruction cache size and data cache size.

The transmux should provide case-wise specialization of a simplified transcoding algorithm to the different MPEG-2 picture types (I, P or B) and macroblock coding type (intra-coded or inter-coded), and account for whether the quantization step size increases or decreases during transcoding.

The transmux should provide an overall software architecture for a transcoder processor element (TPE).

The present invention provides a transmux design having the above and other advantages.

SUMMARY OF THE INVENTION

The present invention relates to a digital video transmux architecture.

A transcoding process in accordance with the invention can be decomposed into the following five steps. A VLIW core processing resource and a BSP processing resource are allocated for the different steps as indicated. The BSP handles the sequential bitstream packing and unpacking tasks. On the MAP-2000CA, the BSP is VLx co-processor 131, which is a VLD/VLE co-processor, although similar devices from other suppliers may be used. The BSP runs multiple transcoding VLE and VLD threads (processing loops). A corresponding architecture is shown in FIG. 1(a).

a) MPEG transport stream decoding (on VLIW core) (10)

b) MPEG video elementary stream variable length decoding (VLD) (on BSP) (20)

c) Core transcoding (on VLIW core) (30), consisting generally of
  c.1) inverse quantization (of VLD output)
  c.2) spatial error motion compensation (and addition to IDCT out)
  c.3) forward DCT of motion compensated error
  c.4) add error (now in DCT domain) to inverse quantize results)
  c.5) forward quantization (to form the VLE input)
  c.6) inverse quantize VLE input and subtract from fwd. quant. input to form cumulative error in DCT domain
  c.7) inverse DCT of error to form spatial error. This error is stored in reference frame buffer to be used in future pictures (step c.2) which reference this image.

d) MPEG video elementary stream variable length encoding (VLE) (on BSP) (40)

e) MPEG transport stream encoding (encapsulates the transcoded video elementary streams) (on VLIW) (50).

Thus, the parsing/demux 10 provides transport stream de-assembly, the VLD 20 provides ES de-assembly, the VLE 40 provides ES re-assembly, and the remux/packetization 50 provides transport stream re-assembly.

Generally, the transcoding of a video access unit (coded picture) is accomplished in N computational steps by M processing elements, where the results of certain steps are used as inputs to later steps (the specific steps in our case are listed above). Each of the N steps may be executed on different processing elements subject to the data dependencies imposed by the algorithm.

One of the key concepts of this invention is that each coded picture is represented by a data structure (the Picture structure) which is passed between the processing elements. Queues of pictures exist at the input to each function (step) which may be serviced by one or more processing elements.

A particular transcoder apparatus in accordance with the invention includes at least a first transcoder processing element (TPE) for receiving input channels of a transport stream comprising compressed digital video data, and first and second processing resources associated with the first TPE for providing data de-assembly, core transcoding, and data re-assembly. Additionally, a queue is associated with the first processing resource for queuing data received from the second processing resource prior to processing at the first processing resource, and a queue associated with the second processing resource for queuing data received from the first processing resource prior to processing at the second processing resource. The first and second processing resources are operable in parallel, at least in part, for providing the data de-assembly, core transcoding, and data re-assembly.

Single or multi-threaded implementations may be used for the VLIW and BSP processors.

A corresponding method is also presented.

BRIEF DESCRIPTION OF THE DRAWINGS

FIG. 11 illustrates the function blocks of the transcoder of FIG. 6 when coding intra-blocks in a non-B-picture, where $Q_2 \leq Q_1$.

FIG. 12 illustrates the function blocks of the transcoder of FIG. 6 when coding intra-blocks in a B-picture, where $Q_2 < Q_1$.

DETAILED DESCRIPTION OF THE INVENTION

The present invention relates to a digital video transmux architecture.

1. Introduction

The transmux is a digital-television network device that addresses the following primary applications:

Transport Stream Grooming—the transmux supports the generation of a single custom transport stream output containing program elements (video, audio, and data) received via up to n transport stream inputs. Grooming refers to selection of the source material for transcoding from the input transport streams.

Video Bit Rate Reduction—Typically, the transmux's transport stream output is not capable of sustaining program elements at their original input bit rate. Therefore, the transmux will employ video rate-reduction technology to ensure the aggregate rate of "groomed" elements does not exceed channel capacity. The bit rate allocated to a particular service (program) is determined by the relative complexity of the service compared to the other services in the multiplex, subject to a constant overall transport stream rate.

Splicing—The transmux supports the ability to splice MPEG-2 programs received via the same or different transport stream inputs. Typically, the spliced elements include a "network" program received via one input and an advertisement (ad) or locally-originated programming received via another input.

Data Insertion—The transmux supports the transmission of various forms of fixed and variable-rate data, including asynchronous and synchronous streams, multi-protocol encapsulation, and data carousels. The transmux exploits null packet "opportunities", including those provided by transcoding, allowing data services to vie for bandwidth as members of a statistical multiplex group containing video.

Figure 1A:
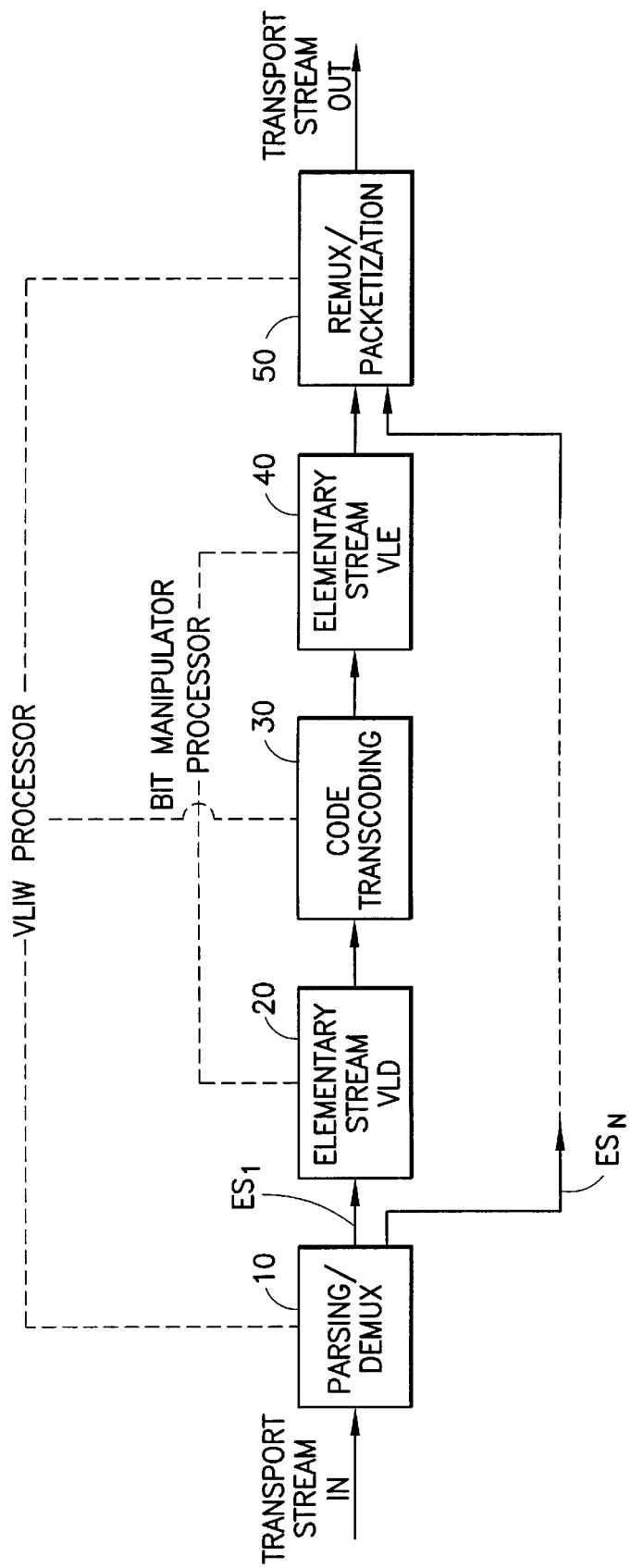
FIG. 1(a) illustrates a transcoding architecture in accordance with the present invention.
Figure 1B:
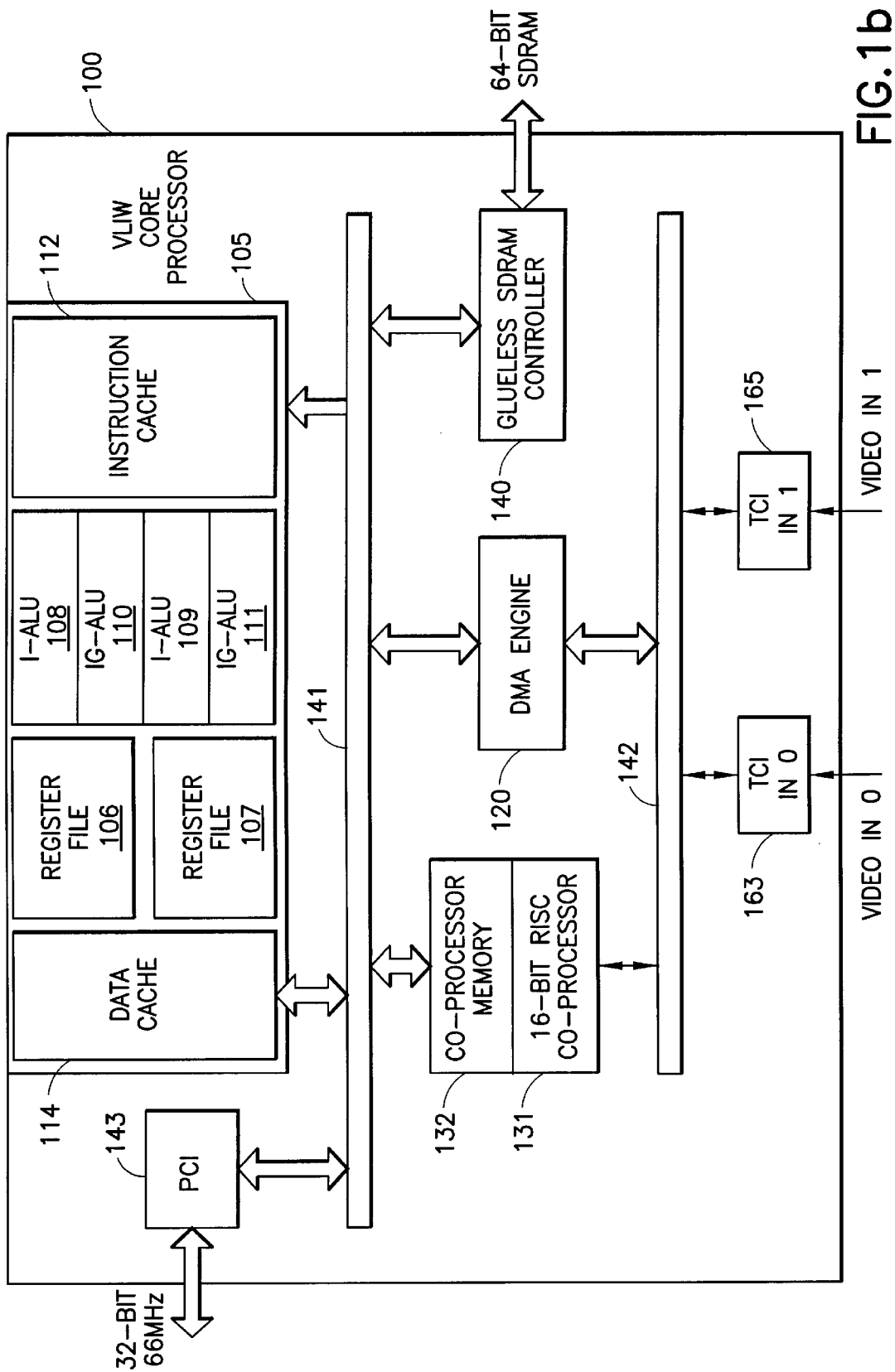
FIG. 1(b) illustrates a media processor for implementing the invention.

FIG. 1(b) illustrates a media processor for implementing the invention.

2. Overview of a Media Processor Architecture

One possible media processor for implementing the invention that is currently commercially available is the Model MAPCA2000™ Media Accelerated Processor for Consumer Appliances, available from Equator Technologies, Inc., Seattle, Wash.

The major components of the media processor 100 are as follows.

1. A VLIW processor 105, consisting of 2 clusters. Each cluster has its own register file 106, 107, containing 64 32-bit general purpose registers, 32 predicate registers, and two 128-bit registers. Each cluster contains two functional units, namely the I-ALU 108, 109, which perform integer/logical/bitwise arithmetic, load/store operations, and branching, and the IG-ALU 110, 111, which perform integer arithmetic, including divide & remainder, 32- and 64-bit partitioned operations, shift/extract/merge, single precision IEEE floating point, 128-bit partitioned (8, 16 & 32-bit factors) FIR and absolute value operations.

2. A 32 KB instruction cache 112 (with stream buffer for expansion of NOPs) is 2-way set associative, 16 byte line size with an LRU replacement strategy.

3. A 32 KB data cache 114 is four way set associative, 32-byte line size and uses the LRU replacement algorithm.

4. Address translation is accomplished by separate TLBs associated with the data cache 114, instruction cache 112 and a DMA engine 120 (known as a DataStreamer™ in the MAPCA2000™). TLB misses cause interrupts and are serviced in SW.

5. A 16-bit RISC CPU (co-processor) 131 includes a memory 132.

6. The DMA engine 120 is an autonomous data mover that is controlled by a descriptor chain which implements I/O-to/from-memory transfers and memory-to-memory transfers. Up to 64 independently scheduled data copy operations (paths) can be in progress at any one time.

7. An internal SDRAM memory controller 140 supports up to 64 MB at 150 MHz with a 64-bit wide data path.

8. Two 32-bit (33 or 66 MHz) PCI bus interfaces 141, 142 are available, with a PCI 143.

9. The on-chip peripherals may include transport channel interfaces 163 and 165. The transmux uses the VLIW processor (and caches/TLBs), the DMA engine, the BSP coprocessor, the transport channel input interface, PCI bus interface and the SDRAM memory interface. All other components of the MAP-2000 package are not used.

VLx is Equator's name for the VLD/VLE (or BSP) co-processor 131. In the TPE, we use this processor, as opposed to the VLIW processor 105, to run the multiple tVLE and tVLD threads.

This bitstream manipulation processor is optimized to perform the inherently serial tasks related to encoding and decoding such as bit field packing/unpacking, Huffman encoding/decoding, and conditional syntax parsing and generation. This processor is usually a general purpose CPU with special instructions or hardware support for these functions.

Figure 2B:
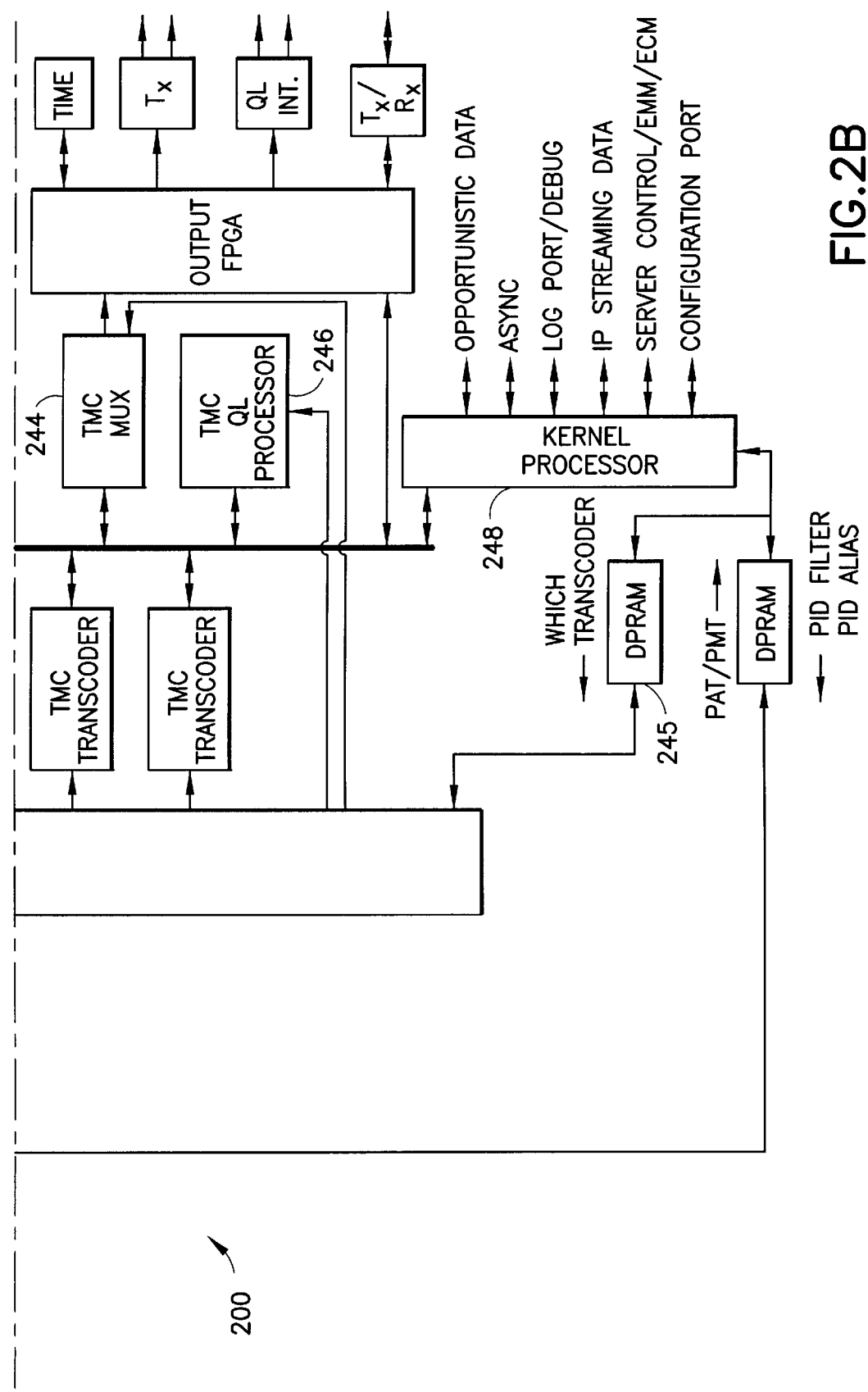
FIG. 2 illustrates an overview of a transmux in accordance with the present invention.

FIG. 2 illustrates an overview of a transmux in accordance with the present invention.

3. Overview of the High-Level Functions of the Transmux

In the transmux 200, a transport multiplex of K video channels is receiver by respective receivers (Rx) 210. K=6 channels as an example only here. Any suitable number of channels may be used. Groomer FPGAs 215 associated with each receiver groom the respective channels and provide the associated data to respective FIFOs 220.

A demultiplexer (DEMUX) FPGA 230 routes the data from the FIFOs to an available one of the transcoders 240 in a bank of L transcoders based on a "which transcoder" signal from a DPRAM 245. The individual transcoders are also referred to as Transcoder Processing Elements. A TPE is a media processor chip (e.g. a MAP2000 series processor) with associated memories and I/O devices. Each TPE processes a number of channels from the input multiplex. During startup or re-configuration, a static assignment of services to TPEs is determined, e.g., using the system discussed in commonly assigned, co-pending U.S. patent application Ser. No._09/666,902, filed Sep. 20, 2000, and entitled "Processor Allocation For Channels In A Video Multi-Processor System."

The TMC module in FIG. 2 may be a MAP-2000CA with 32 MB of SDRAM. The TPE are the TMC module between the demux FPGA 230 and the PCI bus 242. The filtered transport stream input from the demux FPGA 230 is input via the MAP-2000's transport channel input (TCI) port. The output transport packets are sent to the MUX processor 244 (another TMC module) via the PCI bus 242. The MUX processor 244 handles implementation of the statistical multiplexing decision of the QL processor 246, interleaves the output of the TPEs and generates the final PCR timestamps. The output bitrate for the various channels is changed dynamically by the QL processor 246 (another TMC module). The TPEs communicate with the MUX 244, QL processor 246, and Kernel processor 248 via message passing across the PCI bus 242. The kernel processor 248 is the control processor for the system handling the interface to the user, status monitoring and configuration for the DMA engines, and data/PSI/SI sourcing for the output transport stream.

For each input frame of compressed video, the TPE can select from a number of different transcoding tools to apply to the frame. The complexity and transcoding artifacts introduced by these tools varies. In general, the lower the complexity, the more artifacts are introduced by the tool. On a TPE, a number of compressed frames are stored in look-ahead buffers, one buffer for each video channel. The stored bitstreams are first parsed to decode the I/B/P picture type and resolution for every frame. The transcoding algorithm then applies the parsed information to select an appropriate processing mode for every frame in the look-ahead buffers to achieve the targeted bit-rate and minimize the artifacts. The objective of the implementation is to minimize the transcoding artifacts subject to the constraint that the total cycles counts required to transcode all the frames in the buffers do not exceed the available processing power of a TPE, which varies based on the specific implementation. It is permissible for the total number of CPU cycles used in transcoding a particular picture to be greater than can be sustained to meet real-time as long as the average number of cycles over all services processed by the TPE is less than the real-time limit. The transcoded video bitstreams are finally re-muxed for transmission.

4. TPE Architecture

Figure 3B:
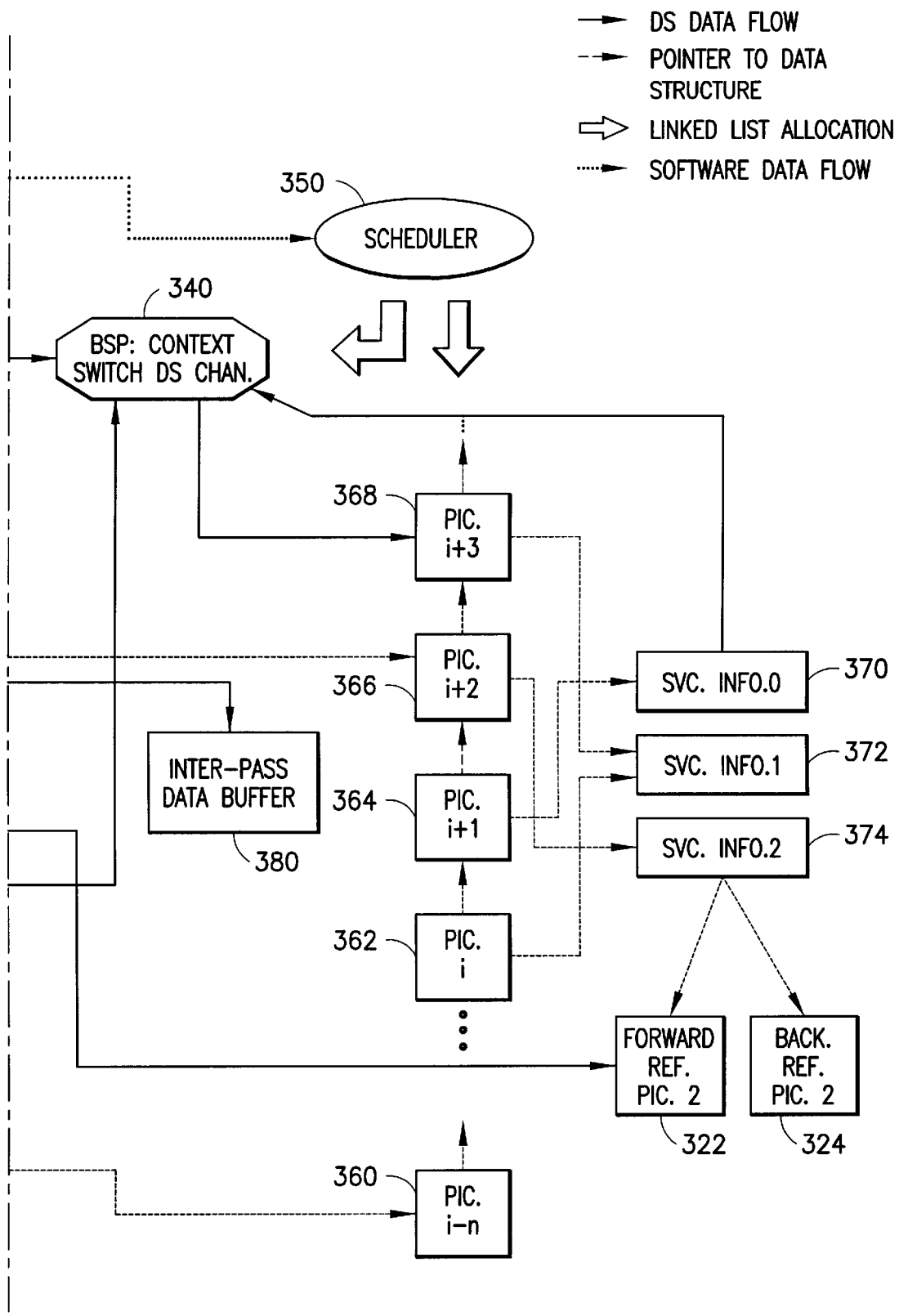
FIG. 3 illustrates a Transcoder Processing Element (TPE) software architecture in accordance with the present invention.

FIG. 3 illustrates a Transcoder Processing Element (TPE) software architecture in accordance with the present invention.

As an example only, the figure shows the data flow associated with three audio/visual data services at a single TPE. Typically, a TPE can handle multiple channels of data. The maximum number of channels that a TPE can handle depends on the TPE's throughput, as well as the complexity of the channel data, as measured by bit rate, coded picture size, frame rate, and other factors.

A transport channel input 308 is demultiplexed (at a demux 306) to provide the three data services to respective input rate buffers 310, 312 and 314. The data services are decoded in turn at a variable length decoder 304, which is responsive to a BSP context switch DS channel function 340, which is, in turn, responsive to a scheduler 350 and service information 370, 372 and 374 of the respective services.

The output of the VLD 304 is provided to input MB FIFOs 316 and input block FIFOs 318. The data is subsequently transcoded at a transcode function 320, which may access a forward reference picture 322 and a backward reference picture 324 as required, e.g., for motion compensation processing of P- and B-pictures. The transcoded function 320 provides the processing steps that follow the VLD and precede the VLE (see FIGS. 6–12).

The output of the transcode function 320 is stored in an output MB FIFO 326 and an output block FIFO 328. The data from the FIFOs 326, 328 is provided to a variable length encoder 302, then to respective output rate buffers 330, 332 and 334 for the example three data services. The data services are remultiplexed at a remux function 336, and communicated via a PCI bus output 242 (see FIG. 2).

An audio portion of the data services may be delayed at respective functions 340, 342 and 344, and recombined with the transcoded video data at the remux 336.

Processing of a number of pictures i–n (360), ... , i (362), i+1 (364), i+2 (366), i+3 (368) is controlled by the scheduler 350.

If the code implementing the transcoding function does not fit into the I-cache without thrashing, the algorithm must be decomposed into passes to execute efficiently (meet the real-time constraints). In this case, intermediate data is stored in the inter-passed data buffer 380.

The media input and output of each TPE is a sequence of MPEG2 transport stream packets as specified in the MPEG2 standard. In one possible embodiment, the transport stream input interface uses the MAP's on-chip TCI port. The transport stream output packets are passed to the mux processor for output. Communication necessary for rate control, statistical multiplexing, and transmux system control, configuration and debugging is based on software message passing between processors on the PCI bus.

FIG. 3 indicates the major components of the TPE software architecture for transcoder. Software processes are indicated by ellipses (ovals) in the figure. The term "process" does not necessarily imply the use of a real-time operating system (RTOS) on the media processor. The present design implements these processes as procedures on the same stack with explicit code to switch between the "processes". When a RTOS is used, this design can be maintained where all of the "processes" can be executed in the same RTOS task.

A brief overview of functions of each of the software processes is provided below. Many media processors for MPEG video coding provide a small autonomous (programmable) device for Variable-Length Encoding 302 and Decoding 304 (VLE and VLD, respectively). On the MAP-2000CA, this BSP is a general purpose CPU called the VLx. The BSP also performs the parsing, packing and unpacking MPEG bitstreams. The variable length decoding (tVLD) and encoding (tVLE) processes in the transcoder execute on the BSP concurrently with the media-processor VLIW processor. All other processes execute on the VLIW processor. The DMA engine, such as the Data Streamer (DS) (also called Data Mover) device, is used in data motion among memories, caches and I/O devices.

The general philosophy is to use the data cache of the VLIW processor as a small, fast working memory such that the DMA engine handles all movement of media data between data cache and external RAM concurrently with VLIW processor execution.

4.1 Key Data Structures and Buffers in the TPE Data-Flow

The TPE uses a media data flow architecture—that is, all of the media data (various representations of audio and video data from the different services being transcoded) pass through a series of computational processes and queues (FIFOs) before it is output. The computational processes act on this data by copying it from one or more input FIFOs (beginning with transport packet input from TCI) to one or more output FIFOs (ending with transport packet output to PCI). The media data is voluminous and has a low locality of reference, so the FIFOs are kept in uncached memory such that the processes access this data via the DMA engine. The functions of data buffers, such as TCIin, Audio delay (Aud Dly), input rate buffer (iRB), input macroblock (iMB), input block (iBlk), output macroblock (oMB), output block (oBlk), output rate buffer (oRB), and PCIout, as well as the key data structures (residing in the buffers) of TPE for transcoding are specified in Table 1.

TABLE 1

Buffers and Key Data Structure for Transcoding Process

| Name | Function | Input DMA engine path | Output DMA engine path | Number per TPE |
|---|---|---|---|---|
| TCIin | Holds timestamped MTS packet until they can be processed by Demux(). Capacity is large enough to hold all transcoded services for one frame period plus scheduling margin (we assume no extraneous transport packets are input). | 1 | 2 | 1 |
| Aud Dly | Audio delay buffers. The size is calculated based on {the maximum audio bitrate} times {the statmux lookahead interval plus 2 video frame periods} | 3 | 19 | m |
| iRB | Video elementary stream input rate buffers. The capacity is video 1 VBV buffer size (plus end-to-end latency times max video bitrate to support bypass mode operation) | 3 | 4 | m |
| iMB | Input (to transcoder) macroblock FIFO. Size is {the max number of MBs per picture} times {the statmux lookahead interval plus one frame} times {size of the data structure MbData_t in bytes}. The MbData_t structure is defined in Table 3, below | 5 | 7 | m |
| iBlk | Input (to transcoder) block FIFO. Size is {the max number of blocks per picture} times {the statmux lookahead interval plus one frame} times {size of the data structure BlkData_t in Bytes}. A BlkData_t structure consists of 64 two byte signed integers:<br>typedef struct {<br>  int16 blk[64];  /* An 8x8 block */<br>} BlkData_t; | 6 | 8 | m |
| fwd & bak | These buffers are the spatial difference images in 4:2:0 [each pixel component is a signed byte]. These image hold the cumulative spatial requantization error since the last intra MB. These images are similar to "reference pictures" in a decoder since contents are referenced by motion compensation and the fwd and bak images are swap before each anchor picture. The current error is always written to the bak image. | 13, 22 | 9, 10, 22 | 2m |
| Intrm | Intermediate data between pass 1 and pass 2 for the transcoding of P and B pictures. This data consists of 6 BlkData_t's and 1 MbData_t structure [regardless if the coded block pattern]. | 11 | 12 | 1 |
| oMB | Output (from transcoder) macroblock FIFO. Size is two times {the max number of macroblocks per tVLE synchronization} times {size of the data structure MbData_t in Bytes} | 14 | 16 | 1 |
| oBlk | Output (from transcoder) block FIFO. Size is two times {the max number of blocks per tVLE synchronization} times {size of the data structure BlkData_t in Bytes} | 15 | 17 | 1 |
| oRB | Output video elementary rate buffers. Size is the video VBV buffer size plus scheduling margin. | 18 | 19 | M |
| PCIout | Output transport packets. Large enough to hold one frame period of data for all transcoded services at the maximum rate + scheduling margin. | 20 | 21 | 1 |

Table 2 describes the DMA engine (e.g., data streamer) usage for a TPE. The data streamer path number can be used to cross reference with the data structures in Table 1. Table 2 lists the logical DMA engine paths only. In the actual TPE implementation, DMA engine resources that are not used concurrently may be reused (see the "path equivalence" remarks below).

TABLE 2

DMA engine path usage

| Path | Description |
|---|---|
| 1 | TCI input path is I/O-to-NC. This path runs forever, filling TCIin repeatedly. |
| 2 | Demux transport packet input (NC-to-D$). The source runs forever, the destination halts after each N MTS packets are read and must be wait halted/continued by the VLIW processor. |
| 3 | Demux output path (D$-to-NC) transfers audio elementary data to aud_delay and video elementary data to iRB. Both source (src) and destination (dst) channels halt and are continued by the VLIW processor. |
| 4 (m) | The iRB output (NC-to-I/O) feeds the tVLD GB input data. These channels (one per service) never halt and are implicitly flow controlled by GB. |
| 5 (m) | tVLD macroblock data output (NC-to-NC) transfers MbData_t's from BSP memory to iMB. The higher level MPEG video syntax is also transferred via this path. There are m separate paths (one per service). The dst channel never halts, and the dst channel is continued by the BSP for each MB. The last word of each MbData_t structure is non-zero, so the BSP can determine that the operation is completed by waiting for the DMA engine to zero this last word. |
| 6 (m) | tVLD block data output path (NC-to-NC) transfers BlkData_t's from BSP memory to iBlk. There is one path per service, so the dst channel never halts. For BSP synchronization, each block copy is followed by zeroing the block buffer (initialization for the random writes cause by the run/level MPEG codewords) When the BSP produces a BlkData_t, the index 63 word always has bit 15 set, so a DMA engine block data copy operation is know to be complete when word 63 is written to zero. |
| 7 | The iMB(NC)-to-D$ reads the MB data processed by each picture during trancoding. The src channel is initialized to transfer the entire picture before stopping so that only the dst channel needs be wait halted/continued during the MB processing loop. |
| 8 | The iBlk(NC)-to-D$ reads block data to be processed by the transcoder. The src channel is programmed to move an entire picture before halting. The dst channel is operated such MB of blocks is read between wait halting/continues. |
| 9, 10 | Are the forward and backward error image MC read paths (NC-to-D$). For each MB, both the src and dst channels are started. The mechanism is identical to MPEG2 decoding, using a double buffer in cache holding a rectangle out of the source image containing the MC pixels justified against the upper left corner. Two descriptor chains are used depending on whether frame prediction or field prediction is needed. Path equivalence: 10==22 and 9==12 |
| 11 | The intermediate data output (D$-to-NC) saves one MB and 6 blocks for each coded macroblock (excludes skipped or errored MBs). The dst channel is programmed to copy the entire picture assuming no errors, so only the src will be wait halted/continued in the MB loop [if error occurred, some of the anticipated MBs are skipped and end-of-picture padding is used to complete the total src count]. Path equivalence: 11==13 |
| 12 | The intermediate data input (NC-to-D$) reads intermediate data from SDRAM during pass 2 of P and B pictures. The source is setup to read the entire picture before halting. All MB and block data for a coded macroblock are read in one operation via the dst channel. |
| 13 | This path copies error data (D$-to-NC) for each anchor picture MB into the "bak" spatial difference frame buffer. Both src and dst channel are kicked and wait halted for each MB. |
| 14 | The oMB input (D$-to-NC) destination channel never halts and the src is wait_halted/continued within the macroblock loop. Special care must be taken in the vicinity of the tVLE synchronization points to avoid FIFO underflow (basically a synchronization cannot be committed until the $7^{th}$ MB after the final synchronization point has been produced and its DMA engine transfer to oMB has been initiated). Dummy data (3 MbData_t's) is inserted in oMB at the end of each picture to allow a possible context switch to other services. |
| 15 | The oBlk input (D$-to-NC) destination channel never halts and the source channel is wait halted/continued within the macroblock loop. A src channel transfer operation copies all block of a MB into oBlk for one halt/continue event pair. Like oMB input, FIFO underflow avoidance generally requires 4 blocks be produced (and DS transfer initiated) beyond the last block of an ending MB_SYNCHRONIZE MB. If this condition is not met due to block sparsity, dummy blocks (skipped by tVLE) are added to this FIFO. Dummy data (2 BlkData_t's) must be inserted into oBlk at the end of each picture to allow for a possible context switch to other services. |
| 16 | The oMB-to-tVLE is an NC-to-NC path where the source channel never halts. The dst channel is continued by tVLE. Before initiating a DS operation, the last word of the MB buffer is written to zero. Thus the operation is complete when the BSP can observe a non-zero word in this location. At the end of a picture, tVLE has read ahead one extra MB and the DMA engine buffer will contain 2 extra MBs. Because this data is lost, a 3 MbData_t gap is required in the input MB flow at picture boundaries. |

TABLE 2-continued

DMA engine path usage

| Path | Description |
|---|---|
| 17 | The oBlk-to-tVLE data flow is a NC-to-NC path where the source channel never halts. The dst channel is continued by tVLE. Before each continue, the last word of the block is written to zero by the BSP and the transfer is deemed complete when the BSP sees a non-zero word in this location (source blocks are always produced with bit 15 of this word set to 1). At the end of a picture, this path will have read (or be reading) on extra block into BSP memory and the DMA engine buffer will (in general) contain on extra block. Thus, a gap of two BlkData_t structures is needed between pictures. |
| 18 (m) | The tVLE-to-oRB is an I/O-to-NC path copying the GB output to SDRAM. The destination channel never halts. Because the DMA engine buffer cannot be easily emptied, there is one path of this type for each service. |
| 19 | This path is used to fetch (NC-to-D$) audio (from aud_delay) and video (from oRB) elementary stream data needed by the remultiplexor to produce the output transport stream packets. Both src and dst channels are wait halted/continued by the VLIW processor during Remux() execution. |
| 20 | This D$-to-NC path takes transport packets produced by Remux() from cache to the PCIout buffer. |
| 21 | This path copies the complete transport packets from the PCIout buffer to the MUX processor across the PCI bus (NC-to-NC). |
| 22 | This path copies the cumulative spatial requantization error from the previous "reference" picture to the "current" reference picture when P-picture skipped MBs (macroblock address increment is greater than 1) are detected. Path equivalence: 10==22. |
| *** | The BSP context switch path copies instructions, VLx_state_t data structures and zeros (initializes) BSP memory data structure need in the BSP context switch process. The function of this path is discussed in more detail in section 4.2.5 |

TABLE 3

The macroblock data structure, MbData_t

```
enum MBFlags {
    MB_QUANT        = 0x0001,   /* new quantizer scale for this MB */
    MB_FWD          = 0X0002,   /* forward motion vector(s) exist */
    MB_BAK          = 0X0004,   /* backward motion vector(s) exist */
    MB_PATTERN      = 0X0008,   /* coded block pattern for this MB */
    MB_INTRA        = 0X0010,   /* this is an intra MB */
    MB_FLDDCT       = 0X0020,   /* use field DCT */
    MB_MOTCODE      = 0X00C0,   /* frame/field motion code */
    MB_FRM_FIELD    = 0X0040,   /* frame structure field prediction */
    MB_FRM_FRAME    = 0X0080,   /* frame structure frame prediction */
    MB_FLD_FIELD    = 0X0040,   /* field structure field prediction */
    MB_FLD_16X8     = 0X0080,   /* field structure 16x8 prediction */
    MB_DUALPRIME    = 0X00C0,   /* dual prime prediction */
    MB_REFFLD       = 0X0F00,   /* reference fields */
    MB_FWDTOP       = 0X0100,   /* fwd top field reference is bot fld */
    MB_FWDBOT       = 0X0200,   /* fwd bot field reference is bot fld */
    MB_BAKTOP       = 0X0400,   /* bak top field reference is bot fld */
    MB_BAKBOT       = 0X0800,   /* bak bot field reference is bot fld */
    MB_NEWSLICE     = 0X1000,   /* first MB of a new slice */
    MB_SYNCHRONIZE  = 0X2000,   /* synchronize with VLIW processor
                                   before this MB*/
    MB_ALWAYS       = 0X4000,   /* always set for DMA engine
                                   synchronization */
    MB_ERROR        = 0X8000,   /* TVLD detected an error in this MB */
};
typedef struct {
    int8    mvc_f0_x;    /* first fwd horiz motion code */
    uint    mvr_f0_x;    /* first fwd horiz motion residual */
    int8    mvc_f0_y;    /* first fwd vert motion code */
    uint8   mvr_f0_y;    /* first fwd vert motion residual */
    int8    mvc_f1_x;    /* 2nd fwd horiz mot code/horiz_dmv */
    uint8   mvr_f1_x;    /* second fwd horiz motion residual */
    int8    mvc_f1_y;    /* 2nd fwd vert mot code/vert_dmv */
    uint8   mvr_f1_y;    /* second fwd vert motion residual */
    int8    mvc_b0_x;    /* first bak horiz motion code */
    uint8   mvr_b0_x;    /* first bak horiz motion residual */
    int8    mvc_b0_y;    /* first bak vert motion code */
    uint8   mvr_b0_y;    /* first bak vert motion residual */
    int8    mvc_b1_x;    /* second bak horiz motion code */
    uint8   mvr_b1_x;    /* second bak horiz motion residual */
    int8    mvc_b1_y;    /* second bak vert motion code */
    uint8   mvr_b1_y;    /* second bak vert motion residual */
    int8    y0_n0c;      /* y0 non-zero coef count */
```

TABLE 3-continued

The macroblock data structure, MbData_t

| | | |
|---|---|---|
| int8 | mbai; | /* macroblock address increment */ |
| int8 | y1_n0c; | /* y1 non-zero coef count */ |
| int8 | qscale_code; | /* quantization scale in 1 ... 31 */ |
| int8 | y2_n0c; | /* y2 non-zero coef count */ |
| int8 | cbp; | /* bit-reversed cbp */ |
| int8 | y3_n0c; | /* y3 non-zero coef count */ |
| int8 | slice_sc; | /* slice startcode (if MB_NEWSLICE) */ |
| int8 | cb_n0c; | /* cb non-zero coef count */ |
| int8 | qscale; | /* quant scale in 1 ... 112 */ |
| int8 | cr_n0c; | /* cr non-zero coef count */ |
| int8 | blk_skip; | /* blocks to skip after this mb */ |
| int16 | stuffing; | /* nbr bytes of padding before slice */ |
| int16 | mode; | /* mb_* constants (must be last) */ |
| } MbData_t; | | |

4.2 Processes in a TPE for Transcoding

4.2.1 Demux

A high-level description of the Demux process 306 is given below. The Demux process examines all incoming MPEG transport stream (MTS) packets from the TCI 308. All packets that are not part of the audio or video PID streams for one of the services being transcoded on this TPE are removed. Audio transcoding is not discussed here. The audio stream retains the same MTS and PES packet structure and will be output as part of the same service after the transcoding system delay. The transmux is a constant delay device and the same delay applies to all components of all services on all TPEs.

The Demux 306 decomposes the transport stream and de-packetizes elementary stream syntax for the video components and identifies the individual video access units (i.e., coded pictures). A video access unit consists of the coded picture plus all higher level syntax preceding the picture, and any stuffing bytes following the last slice of the picture. Once the access unit has been identified, a picture structure is allocated. Selected MTS and PES layer information to be preserved is stored in the picture structure (for inclusion in the output PES and MTS syntax).

The Demux process 306 scans the video elementary stream for startcodes to identify the access units (coded pictures). It must also determine the size (in bytes) of the coded picture and the presentation duration of each picture (from the coded frame rate and the repeat_first_field flag). The picture size is used to determine when a complete picture is available in the input rate buffer (iRB), and is also used to calculate needed parameters for the statmux and rate-control. The presentation duration is used to construct a DTS for this picture in the event that it is not present in the PES packet. The current offset between the local 27 MHz clock and the program clock at the beginning of this picture is determined and stored in the picture structure.

4.2.2 Scheduler

Figure 4:
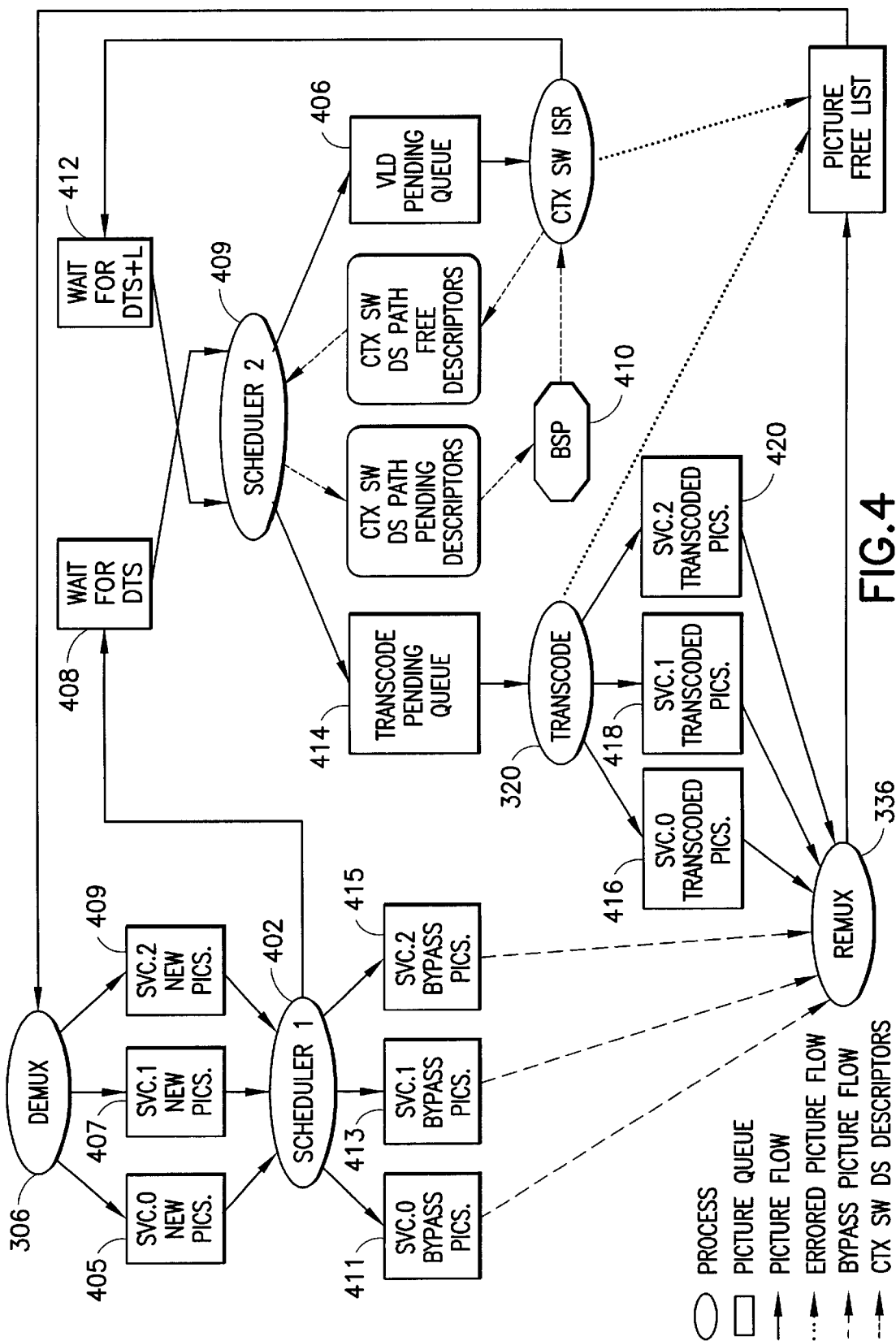
FIG. 4 illustrates the manipulation of picture queues using schedulers in accordance with the present invention.

FIG. 4 illustrates the manipulation of picture queues using schedulers in accordance with the present invention. Like-numbered elements correspond to one another in the figures.

New pictures from the three example services 405, 407 and 409 are provided from the demux 306 to a first scheduler 402. Additionally, the scheduler 402 provides bypass pictures 411, 413 and 415 to the remux 336. Some pictures will bypass transcoding, e.g., when there is no current need for bit reduction. The remux 336 also receives coded pictures from the respective services 416, 418 and 420.

Internal control of the processing entities described earlier is handled by manipulation of queues of pictures. The picture data structure contains all video, PES and MTS picture data (e.g., PES and MTS timestamps, VLx_state_t data used by tVLD and tVLE, picture type, size and presentation duration), as well as a pointer to the service data structure. The service data structure contains information such as the MTS PIDs used by the service, the address and size of the per-service queues (e.g., iRB, iMB, iBlk, oRB, Audio Delay), video sequence parameters and quantization matrices.

The first scheduling module (Sched1) 402 interleaves the pictures from the different video services into the TPE's local processing order. This is done on the basis of decoding timestamp (DTS) order. The next picture to be transcoded is removed (in FIFO order) from one of the per-service input picture queues if: (1) its DTS (when converted to the local time base) is the smallest among all services, and (2) the beginning of the next picture (following the picture being considered) has been detected and copied to the input rate buffer.

Picture structures remain in the "wait for DTS" queue 408 until that picture's DTS time occurs. The coded picture resides in the input rate buffers during this period. The second scheduling module (Sched 2) 404 moves the pictures from the "wait for DTS" queue 408 to the "VLD pending" queue 406 when the DTS time elapses and the BSP 410 is scheduled to process this picture.

This is only part of the function of the "Sched 2" module; it is also used to allocate the BSP to the tVLE function. The process running in the BSP is not independent of the VLIW processor because there is a relatively tight interaction between the transcoder and the tVLE processes. The transcoder monitors the number of bits generated by the tVLE to determine if the target number of bits for the current picture is being met. If a discrepancy between the target bit rate and the actual number of bits exists, a rate control feedback mechanism in the transcoder adjusts the quantization levels used in coding the output MPEG blocks to more closely meet the target bits rate. This means that tVLE must stop every N macroblocks to report the number of bits generated to allow the transcoder to update its quantization parameter. The number N is, e.g., roughly one half row of macroblocks.

This interaction between the transcoding process and the BSP variable length encoding process means these two functions must execute concurrently on their respective processors. This constraint has significant implications for the load balance between the transcoder and tVLE and also between the tVLD and the remaining VLIW processor software processes. A simplified version of the outer loop of the TPE is shown in Table 4.

TABLE 4

The outer loop

```
/*
*/ Outer loop of the single threaded TPE
*/
for (;;) {                // BSP
    Demux();              // tVLD    demultiplex all available inputs
    Schedule();           // tVLD    determine what to do next
```

TABLE 4-continued

The outer loop

```
    Transcode();          // tVLE    Transcode pictures
    Remux();              // tVLD    Re-assemble MTS packets
}
```

Pictures eligible for transcoding are taken from the "Wait for DTS+L" queue 412 when the statmux lookahead interval, L, has elapsed for the particular picture. The pictures are moved to the "transcode pending" queue 414 until they can actually be transcoded. The "Sched 2" module 404 is responsible for toggling between the tVLE/transcode mode of operation and the tVLD/demux/remux operation. To minimize the number of times the BSP code image is swapped and to keep the VLIW processor cache locality, all pictures pending for transcoding (and VLE) are processed first, followed by all pending VLD operations.

4.2.3 tVLD tVLD is the BSP function which parses the video elementary stream into the MbData flow and the BlkData flow. tVLD will process one access unit (picture), then relinquish control so the BSP can be reassigned (by the scheduler) to VLD on other services or to VLE. Each active service contains a VLD thread and a VLE thread which cooperatively shares the BSP. A data structure (VLx_state_t) is used to hold all BSP thread context plus data specific to the video access unit being processed.

The VLD program reads the bitstream data and produces two memory-to-memory output streams, MbData and BlkData, and a BSP-memory resident data structure, VLx_state_t, described in Table 5. Once started, the VLD program will process one MPEG-coded picture before stopping. No VLIW processor interaction is required during this processing stage.

TABLE 5

VLx_state_t structure

```
typedef struct {
    uint16      context;              /* State chg & buf use (CTX_* consts) */
    uint16      gbstate[15];          /* Getbits state */
    uint16      mbdata_chan;          /* MbData channel index */
    uint16      blkdata_chan;         /* BlkData channel index */
    uint16      rcodes;               /* fh=15:12, fv=11:8, bh=7:4, bv=3:0 */
    uint16      pict_flags;           /* Picture type and flags */
    union {
        struct {
            uint16 nblocks;           /* Number of coded blocks */
            uint16 nmb;               /* Number of coded macroblocks */
            uint32 mquant_sum;        /* Sum of all mquants for this pic */
            uint16 seq_hdr_off;       /* Offset to sequence header or -1 */
            uint16 seq_ext_off;       /* Offset to sequence extension or -1 */
            uint16 pic_hdr_off;       /* Offset to picture header */
            uint16 pic_ext_off;       /* Offset to picture coding ext or -1 */
            uint16 quant_ext_off;     /* Offset to quant mtx ext or -1 */
            uint16 ending_startcode;  /* SC ending last slice of last pic */
        }       vld;                  /* Output from the VLD program */
        struct {
            uint32 picture;           /* Service identifier (Picture *) */
            uint16 sync_mbnum;        /* Synchronization MB number */
            uint16 mbbits;            /* Nbr MB bits since last synch */
        }       vle;                  /* Variables used for VLE/VLIW processor synchronization */
    }       u;
    uint16      hisyntax_bytes;       /* Bytes of higher-than-slice syntax */
    uint16      ctx_sw_loc;           /* Zero if not done, else restart addr */
} VLx_state_t;
```

The BSP cannot detect when a DS channel halts. Since the BSP must verify a channel has halted before issuing a DS continue, the transfer complete condition must be determined by polling the last word of data being transferred. For copies into BSP memory, the last word being transferred before the DMA engine halt must be non-zero, and the location in BSP memory is initialized to zero. The BSP will detect the completion of transfer by observing a non-zero value in this location. For copies out of BSP memory, again the last word of the block of data transferred before halting must be non-zero, and the DMA engine must be programmed to zero this source region after completing the copy. The BSP knows the DMA engine channel has halted when it sees a zero in the last location being transferred.

VLD uses the DMA engine in transferring data for:

1. reading the bitstream to BSP memory;

2. moving the-MbData from BSP memory to main memory (SDRAM). The MbData flow is used to convey the higher-than-slice level syntax as well as macroblock information;

3. moving the BlkData from BSP memory to main memory (SDRAM) and zeroing the coded block buffers in BSP memory; and 4. BSP state exchange (interrupts VLIW processor on completion of access unit).

The DMA states of the bitstream input path are preserved between invocations of VLD on the same bitstream, however the other paths can be reset and/or reused. The VLx_state_t structure contains counts of the amount of data written on each flow at the time VLD halts.

The bitstream input DMA channel is assumed not to halt. It consumes data from a large elementary stream buffer and when VLD is invoked, at least one full coded picture is assumed to exist in the buffer. There is no way to detect (or wait for more information regarding) buffer underflows.

The MbData flow source channel halts after each MbData_t structure is transferred. It is explicitly continued by the VLD to implement a double buffered copy from BSP-memory. The BlkData source channel uses a similar strategy. The state channel is used to copy the VLx_state_t structure into and out of BSP-memory. It interrupts the VLIW processor as necessary to synchronize with BSP execution (e.g., to reload BSP, to reset/reallocate DMA engine resources and to flow control BSP with respect to the source/sinks of its data). This channel is continued by the VLD/VLE at the end of each picture.

The picture data (in VLx_state_t) consists of information extracted by the tVLD from the picture header and picture coding extension. It includes the picture type (I, P, or B), DC intra precision, picture structure, top field first flag, frame prediction frame DCT flag, concealment motion vectors flags, quantization scale type flag, intra VLC format flag, alternate scan flag, repeat first field flag, full pel forward flag, full pel backward flag, and the r_codes (f_codes—1) for each motion vector component and prediction direction. Also included in the picture data are the number of bytes of high level syntax, offset to the syntax mentioned above, BSP getbits (GB) unit state, tVLD DMA engine channels and buffer indices, the number of coded blocks and the number of coded macroblocks in the current picture. After decoding a picture, this information is copied in to the Picture data structure where it is used by the transcoder, tVLE and Remux. An error flag also exist to mark the occurrence of an unrecoverable error in the current picture.

The sum of all of the decoded quantizer scale value in the 1 to 112 range (for every coded macroblock) is accumulated by tVLD. This number is also returned with the Picture data. This information is combined with the picture type and coded picture size to form the stat mux need parameter. The statistical multiplexing algorithm use, e.g., a 166 ms (five frames at 30 fps) lookahead, and a one-second history to determine the target bit rate for each picture in each service. As soon as the tVLD operation is complete for each picture, this information is sent to the QL processor (via the PCI bus). The size of the input block (iBlk) queue, input macroblock (iMB) queue, and the "wait for DTS+L" picture structure queue 412 is based on the lookahead requirement.

The macroblock and block data are flows of information copied out the BSP memory by the DMA engine. In general, there are variable numbers of macroblocks (due to skipped macroblocks denoted by a macroblock address increment greater than 1) and variable numbers of blocks per macroblock (denoted by the number of "1" bits in the coded block pattern). Only coded blocks and macroblocks are produced by tVLD. As blocks and macroblocks are decoded by tVLD, the DMA engine copies this data into the iMB queue and the iBlk queue for the current service. These queues reside in uncached SDRAM and are accessed only by the DMA engine in non-coherent mode.

Figure 5:
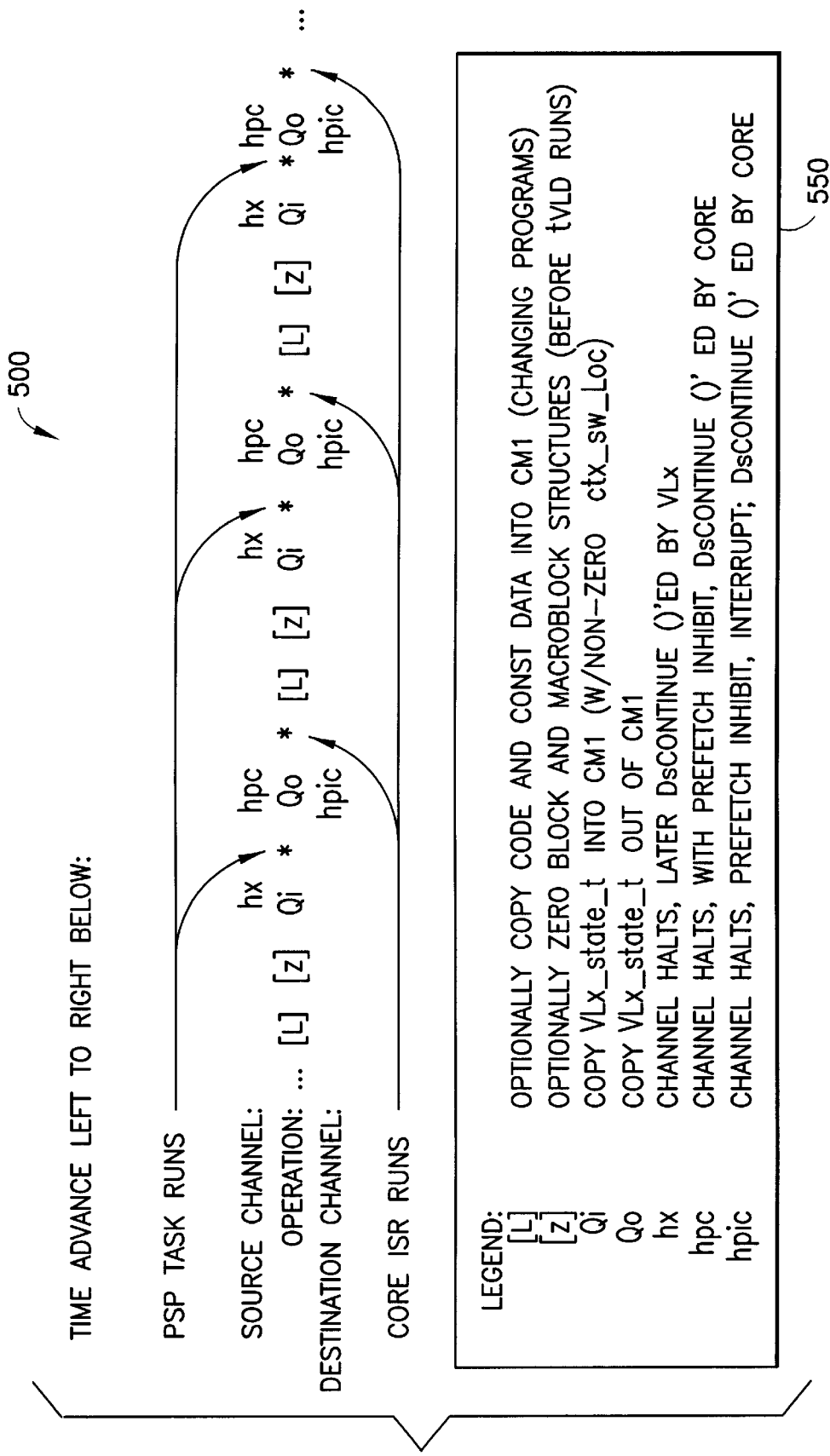
FIG. 5 illustrates the operation of a context switch path in accordance with the present invention.

FIG. 5 illustrates the operation of a context switch path in accordance with the present invention.

As shown in the time sequence 500, and referring also to the data structure of Table 3, the macroblock data consists of a 32-byte structure for each coded macroblock containing:

1. A flag indicating whether this macroblock is the first macroblock of a slice. The slice vertical position as given by the last byte of the slice start code is included.

2. The decoded macroblock address increment is given to keep track of skipped MBs and the screen position of the current MB.

3. The macroblock type flags (quantizer exists, forward MC, backward MC, coded block pattern exists, intra coded) are provided.

4. The dct_type bit (frame vs field) is present.

5. The motion_type (frame_motion_type for frame structure and field_motion_type for field structure) exists.

6. The quantization level (whether present in the current MB or not) is include as both the 5-bit quantizer_scale_code and the decoded quantizer_scale in the 1 to 112 range.

7. The partially decoded motion vectors (in motion_code and motion_residual format). The delta motion vector used in dual prime prediction is represented. When field prediction is used, the reference field selector bits are included.

8. The coded block pattern is present to indicate which and how many coded blocks are part of this macroblock.

9. An error flag is present which is denotes the presence of a detected syntax error. If an error occurs, an attempt is made to resume decoding at the next slice.

The legend 550 explains the syntax of the sequence 500.

When header information (higher than slice level syntax) is processed, a verbatim copy of this data is stored in the MbData flow. Header information is packed in 30 byte chunks such that the last 2 bytes of each 32-byte unit is the non-zero flag used by the BSP to detect a transfer complete.

The block data comprises an 8×8 array of decoded, quantized DCT coefficients, represented as signed 16-bit numbers. The intra DC value is the differential DC; the previous intra DC value for the same color component (or 128) must be added to get the actual DC value.

Note:

1) The DPCM (de-)coding of intra DC blocks is performed in the VLIW processor. Intra-block DC terms are the differential DC values as input/output to the BSP.

2) The DPCM (de-)coding of motion vectors is performed in the VLIW processor. Each motion vector component (horizontal or vertical) is stored as a pair of (motion_code, motion_residual) in MBData_t.

3) The M received programming services can either have separate or common MbData_t & BlkData_t buffers and DS paths. In both cases, the DS channels are not necessarily flushed or reset between BSP loads. Even if the M services share memory-to-memory DMA engine buffers/paths, tVLD and tVLE need separate paths for the bitstream I/O via the BSP GB unit.

4) To increase the parallelism of BSP and VLIW processor, one can, sometimes, (a) speed up tVLE by receiving run/level pair sequences instead of BlkData_t from the VLIW processor, and (b) speed up tVLD by providing run/level pair sequences to the VLIW processor. Item (b) also saves space in the look-ahead buffer.

4.2.4 tVLE

The tVLE process consumes block and macroblock data from the output block (oBlk) and output macroblock (oMB) FIFOs produced by the transcoder. These two FIFOs are used by all services (only one of each FIFO exists), and these FIFOs are empty when the transcoder switches from one picture to the next. The DMA engine is used to fetch data from each FIFO for tVLE using the non-coherent access mode. The output video elementary bitstream is stored into the output rate buffers (oRB) via a non-coherent memory write DMA engine path.

tVLE is intended to be an error-free phase. All bad pictures should be deleted so that they are not seen by the tVLE. The bad syntax errors that are recovered by scanning to the next slice startcode result in sequences of skipped macroblocks being passed to tVLE.

As described earlier, the transcoder and tVLE synchronize every N macroblocks to exchange information on the number of bits produced since the last synchronization. Only slice, macroblock and block level bits are counted; the size of the header syntax is constant and is not included. The synchronization points occur after macroblocks tagged with the MB_SYNCHRONIZE flag as a mode-bit in MBData_t. The macroblocks do not need to be regularly spaced; however, some of the restrictions are:

1. The last macroblock must be tagged by MB_SYNCHRONIZE (otherwise the final increment on the number of bits is not included). tVLE does not count blocks or macroblocks; it relies on the transcoder to inform it that the end of picture has been reached.

2. The number N cannot be too small, otherwise the input DMA engine paths will read data beyond what has been written by the transcoder. The transcoder must remain at least two coded blocks and two coded macroblocks ahead of tVLE to prevent FIFO underruns because the DMA engine cannot check for this condition. Another, more general, reason to avoid small values of N is that synchronization is expensive in performance terms; it forces the faster processor to wait by spinning.

3. N should not be too big. The BSP keeps the accumulated bit count as an unsigned 16-bit number which cannot be allowed to wrap around. Larger values of N result in a longer response time for correcting the quantization level that means less accuracy in meeting the target bit rate.

The VLE produces the transcoded MPEG video elementary bitstream. All higher than slice level syntax is not changed from the source bitstream; this syntax is copied from the MbData flow directly into the output bitstream. Slice, macroblock and block syntax is produced according to the MbData_t and BlkData_t structures read. For rate control purposes, tVLE counts the output slice/MB bits produced and stops (spins), passing this information to the VLIW processor whenever the MB_SYNCHRONIZE flag is set in the mode word of a MbData_t structure.

This synchronization mechanism places certain requirements on the way the oBlk and oMB FIFOs are managed. tVLE uses a read-ahead strategy such that DMA engine read of the block and macroblock beyond the synchronization point have been initiated before it is known that tVLE will pause for VLIW processor synchronization. Additionally the DMA engine buffers also read data beyond the information transferred to BSP memory. This means that 3 MbData_t structures (there are 2 MbData_t structures in the minimum size DMA engine (e.g., DS) buffer) and 2 BlkData_t structures beyond the MB_SYNCHRONIZE macroblock must be in external RAM before synchronization is attempted to avoid FIFO underflows. The process the transcoder uses to write data into the oBlk and oMB FIFOs is a pipelined write-behind algorithm, which means that the VLIW processor must have initiated the writes of at least 6 MbData_t structures and 4 BlkData_t structures to guarantee no underflow can occur.

If, at the time six coded macroblock writes to oMB have been initiated, fewer that 4 coded blocks have been written, then dummy blocks must be inserted into the oBlk FIFO to avoid underflow. tVLE is informed of these dummy block via the "blk_skip" field in MbData_t; this field tells tVLE to skip the specified number of block following the current macroblock.

The occurrence of the end of a picture (EOP) presents several complications. First, if EOP is found within six coded macroblocks from a MB_SYNCHRONIZE macroblock, the synchronization point is moved to EOP (which is a required synchronization point). Second, it is not practical to avoid oMB and oBlk underflows at EOP because of scheduling multiple services and because multiple services share the same oMB and oBlk FIFOs. For these reasons, a "harmless" underflow is allowed at end of picture. The underflow is made harmless by inserting a "gap" of 3 MbData_t's and 2 BlkData_t into the FIFOs between pictures. These gap structures are read and ignored by tVLE when it begins processing a new picture.

VLE use the following DMA engine (e.g., DS) paths:

1) BSP context switch path is used to replace the VLx_state_t structure in BSP memory for context switch purposes. The BSP does a DsContinue on the source channel of this path at the end of each picture, then waits on ctx_sw_flags for completion (NC-to-NC).

2) The MbData flow is a mem-to-mem (NC-to-NC) copy where the source channel halts after each MbData_t structure is copied so tVLE can do a double buffered read. This path may be reset and reused between tVLE invocations.

3) The BlkData flow is a mem-to-mem (NC-to-NC) copy where the source channel halts after each BlkData_t structure is copied so tVLE can do a double buffered read. This path may be reset and reused between tVLE invocations.

4) The GB output stream store the bitstream into SDRAM. The GB output state is saved/restored in VLx_state_t and the DMA engine state of this path must not be disturbed between tVLE invocations.

For tVLE, the ".qscale_code" field in MbData_t is the 5-bit "quantizer_scale_code" to be placed directly in the bitstream. If MB_NEWSLICE is set, MB_QUANT should be clear to avoid sending .qscale twice for this macroblock.

4.2.5 BSP Management

The BSP processes (tVLD and tVLE) operate on one picture at a time. When the current picture is complete, the BSP gets context-switched to another service, and perhaps to another function (e.g., VLD vs. VLE). It is possible that no next function exists (e.g., the BSP is idle and Waiting for the VLIW processor and simple executes a spin loop until more work is ready). This context switch process is accomplished by the DMA engine and is basically asynchronous to the VLIW processor. The BSP context switch procedure is as follows:

1) The ending BSP process saves all necessary states in a BSP-memory resident data structure (i.e. VLx_state_t, see Table 5). This includes the state of the BSP hardware getbits (GB) unit.

2) The source channel of the BSP context switch memory-to-memory DMA engine path is continued. The continued operation copies the VLx_state_t structure from BSP memory to a designated location in SDRAM.

3) The BSP zeros .ctx_sw_loc field of the VLx_state_t, then enters a fastloop which polls this location. The fastloop is exited when this location becomes non-zero by jumping to the address read from this word.

4) The VLIW processor is interrupted by the completion of the VLx_state_t copy from BSP memory. This interrupt allows the VLIW processor to monitor the progress of the BSP. The functions of this ISR are described later.

5) If another runable BSP thread exists, the context switch path will: (a) optionally reload the BSP memory text image (instructions and tables), (b) initialize/zero any working data structure, and (c) reload the VLx_state_t buffer with the state of the new BSP thread. The ".ctx_sw_loc" entry of the new VLx_state_t structure contains the entry point address for this thread, and a branch to this entry point occurs as soon as BSP detects this non-zero value.

6) If there is no runnable BSP thread immediately available, the BSP continues to poll .ctx_sw_loc in its fastloop. The BSP context switch DS path will halt (both source and destination channels) such that it is continued as soon as a new BSP thread becomes runnable [goto step 5].

The BSP context switch DMA engine path does a minimum of two copies in the context switch process. First, the ending process' state structure is copied to SDRAM. Second, the state structure of the new BSP process is copied from SDRAM into to BSP-memory. All state structures for all BSP processes have a common format (containing a VLD vs. VLE union) and reside at a common well-known address in BSP-memory. If the BSP code image is to be changed, on this context switch, the context switch path copies it into BSP-memory between the removal of the old state structure and the installation of the new state structure. The source and destination descriptors for the context switch path are in 1-to-1 correspondence; and they are dynamically defined by the "Sched 2" module 404 (see FIG. 4). Every time a picture is added to the "transcode pending" queue 414, the corresponding tVLE execution is scheduled via adding new descriptors to the context switch source and destination channels. For each picture moved to the VLD pending queue 406, the tVLD execution is scheduled similarly such that all tVLE executions occur before all tVLD executions in each scheduling cycle (an iteration of the outer program loop).

FIG. 5 illustrates the operation of a BSP context switch path in accordance with the present invention.

For the VLIW processor to keep track of the progress made by the BSP, the destination descriptor for the ending BSP process' state copy to SDRAM interrupts the VLIW processor on completion. The VLIW processor ISR is used to perform various house keeping functions including:

1. Freeing of the executed descriptors for both the source and destination channels of the context switch path.

2. Providing VLIW processor synchronization state (so the transcoder will know that tVLE is running).

3. Moving the picture structures from the "VLD pending" queue to the "Wait for DTS+L" queue.

4. DsContinue()ing both the source and destination channels. This function is necessary to prevent the context switch path from "running off the end of the list" in the event there is no additional BSP work to schedule at this instant.

4.2.6 VLIW Core Transcoder

The basic function of a video transcoder is converting a high-bit-rate bitstream to a low-bit-rate bitstream. Additional features, such as commercial insertion, logo insertion, and grooming, can also be implemented in the process. The transcoder (VLIW engine) performs the transcoding functions (tools) such as motion-compensation, DCTs, and Quantizations.

Figure 6:
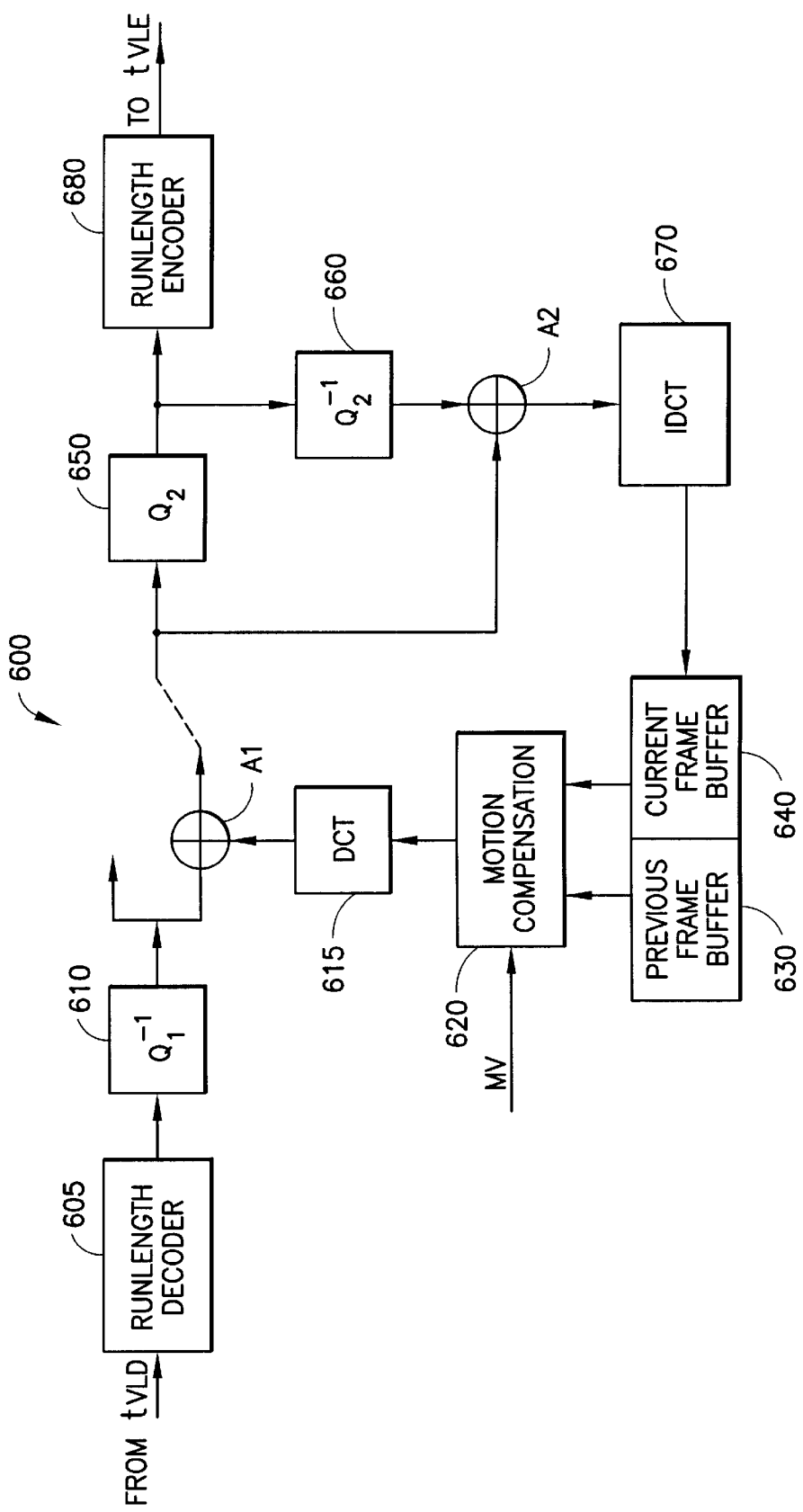
FIG. 6 illustrates a transcoder for use in accordance with the present invention.

FIG. 6 illustrates a possible transcoder for use in accordance with the present invention. Such an architecture performs most operations in the DCT domain, so both the number of inverse-DCT and motion compensation operations are reduced. Moreover, since the motion vectors are not recalculated, the required computations are dramatically reduced. Based on this architecture, a further simplification can be made. After careful comparison, it is believed that this architecture offers the best combination of both low computation complexity and high flexibility.

Some of the crucial considerations for real time programming on VLIW machines are:

1) The media processing algorithm must efficiently use the instructions available, particularly the partitioned word arithmetic. In these modes, a single instruction operates on a word (32, 64 or 128 bits) which is treated as a short vector of 8, 16, or 32 bit elements in single instruction, multiple data (SIMD) fashion. All of the inner loop manipulation of media data (pixels, DCT coefficient, . . . ) must use these instruction to obtain real time video computational performance.

2) Multiple functional units must be kept busy and operating in parallel. Most of the time this can be done with sequences of assignment statements-with minimum statement-to-statement data dependency. Often this can be achieved by unrolling loops if iteration-to-iteration data independence exists.

3) Branching is slow and the "delay slot" operations are difficult to utilize. Branching is minimized by use of data select operators (?: in C), unrolling loops and in-lining small functions.

4) Efficiently using the caches (no thrashing). For the instruction cache, this means the entire macroblock loop of a picture should remain cache resident in normal cases. Exceptions can be made for rare events (e.g., tVLE synchronization or error recovery) and during the picture change. For the data cache, the data working set must be cache resident (DS transfers media data into and out of cache), including the top-of-stack.

5) The VLIW register resources must be used efficiently. Each of the two clusters on the MAP have 64 32-bit registers which are used by local scalar variables and expression temporaries. In-lining functions can increase the number of registers in use. Saving and restoring of large numbers of registers, which occur on real function calls and interrupt entry and exit, should be minimized.

In FIG. 6, before each anchor picture, the previous frame buffer (P_FB) 630 and current frame buffer (C_FB) 640 are swapped (by pointer exchange). During B picture transcoding, P_FB 630 is used for forward motion compensation and C_FB 640 is used for backward motion compensation. These frame buffers hold spatial difference images, representing the pixel by pixel error or noise signal introduced by bitrate reduction. In the efficient transcoding algorithm discussed here, the motion vectors, prediction (motion) mode, inter vs. intra, and frame vs. field DCT attributes of a macroblock are unchanged by the transcoding process.

The key function blocks in the transcoder 600 are:

1. (Optional) runlength decoder (RL-Dec) 605: Convert (Run, Value) pair into 8×8 2-D arrays. This step may occur in the tVLD.

2. $Q_1^{-1}$: Inverse Quantization (610) for the decoder. As inverse quantization is only performed on the Value of a (Run, Value) pair, the number of operations is far less than 64 per 8×8 block. Many 8×8 blocks are all zeros, as indicated by the MEPG CBP flag, so the total computation for $Q_1^{-1}$ is small. The input bitstream quantization scale, $Q_1$, is used here.

3. DCT (615): Forward DCT. The required computational load is about the same as for the IDCT. However, it has to be performed on the motion compensated prediction of every 8×8 coded inter block in a frame. The field DCT permutation, if needed, occurs between the MC 620 and DCT 615 blocks.

4. MC (620): Motion Compensation (MC) for the decoder accesses both P_FB 630 (for forward MC) and C_FB 640 (for backward MC), and it has to be performed on all the blocks of a frame. MC processing results in low computations but high memory access. The data required by MC is fetched from the reference pictures in SDRAM via the DMA engine. A fixed size rectangle of pixels (for each color component) is retrieved such that the upper left corner pixel is the uppermost and leftmost pixel contributing to the MC output (in half-pixel interpolation).

5. A1: Adds the motion compensated and transformed block to the $Q_1^-$ output to form the reconstructed frequency domain block. This function loads data from buffer C_FB and then stores data back into C_FB. The computation is simple addition, but memory access includes two loads and one store for every pixel.

6. $Q_2$ (650): Quantization on DCT coefficients. This operation is performed on all 64 data points of a 8×8 block, and every block in a frame. The output quantization scale, $Q_2$, is used in this step.

7. $Q_2^{-1}$ (660): Inverse Quantization for the encoder using the output quantization scale. This function has a lower computational load than $Q_1^{-1}$ 610.

8. A2: Subtract motion compensation from the reconstructed image to form difference block. The output of this block represents the frequency domain accumulation of all errors over the prediction chain.

9. IDCT (670): Inverse DCT for the decoder. The IDCT requires many operations (19 additions and 13 multiplications for the popular Chen-Wang fast DCT algorithm for an 8-point 1-D transform). The spatial results of the IDCT are stored into the C_FB frame buffer 640 for anchor pictures. The C_FB frame buffer must be updated even if the CBP input bit for this block is zero or if the $Q_2$ quantization step results in a zero block.

10. (Optional) runlength encoder (680) RL-Enc: Generate (run, level) pair. This function block does little computation but accesses memory by loading quantized DCT coefficients. Since "Run" has to be calculated sequentially, it is hard to parallel this operation. The step may occur in tVLE.

Although the architecture of the transcoder is fixed, the data flow can be simplified, in some cases very significantly, by looking at specific scenarios. The transcoder architecture in FIG. 6 has many function blocks, but not all of them are used for every picture type or macroblock coding mode. According to the picture type and macroblock type, we classify all conditions into six categories, where each category results in certain simplifications.

Figure 7:
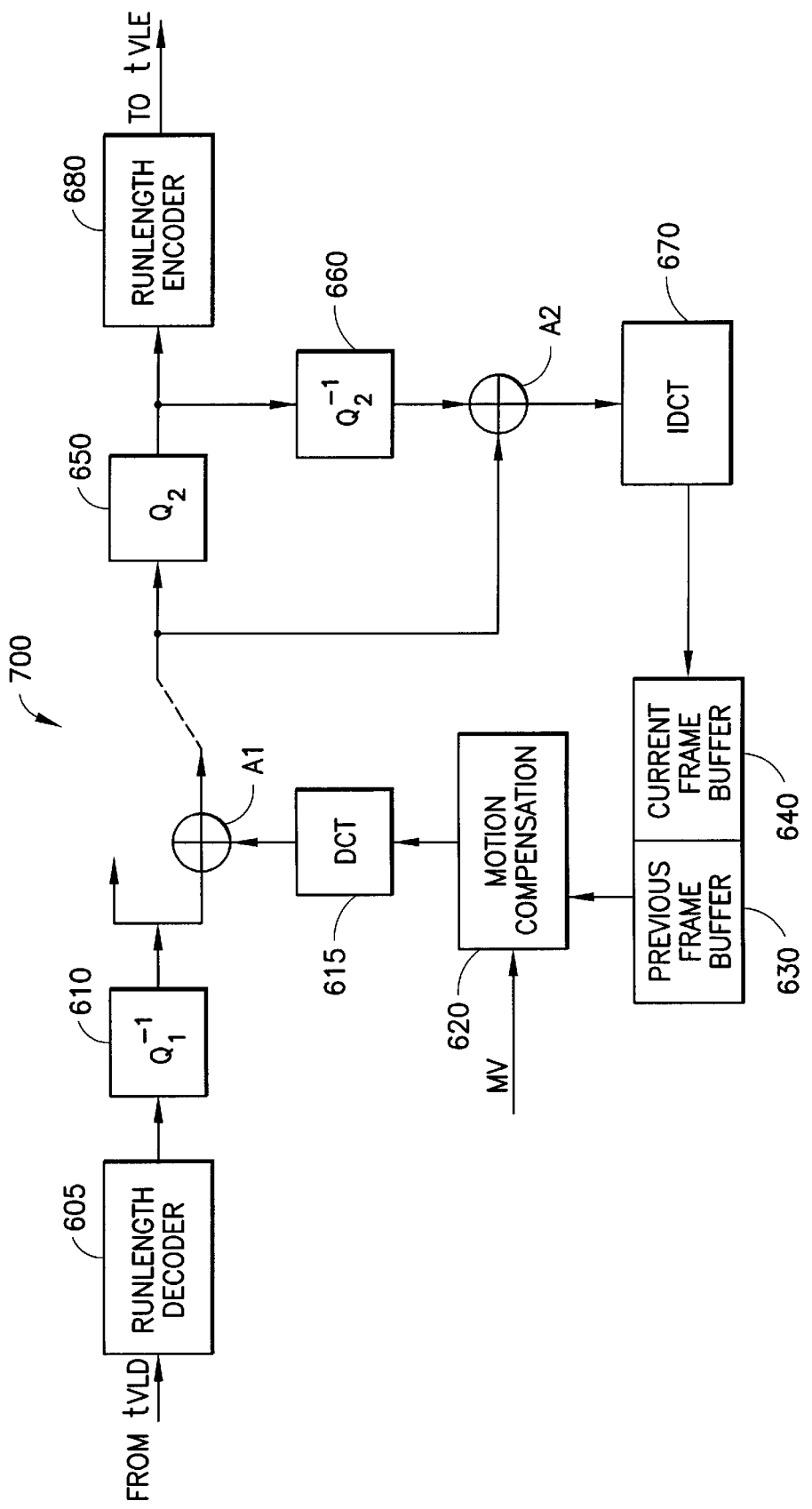
FIG. 7 illustrates the function blocks of the transcoder of FIG. 6 when coding inter-blocks in a P-picture.

1) P-picture, inter-block. This category uses the most of the function blocks and, therefore, is most time-consuming. FIG. 7 illustrates the function blocks of the transcoder of FIG. 6 when coding inter-blocks in a P-picture. Like-numbered elements correspond to one another in the figures. FIG. 7 shows a transcoder 700 that uses all of the function blocks as the transcoder 600 of FIG. 6. Only backward motion compensation is missing. This is the worst case (i.e., most computationally intense).

Figure 8:
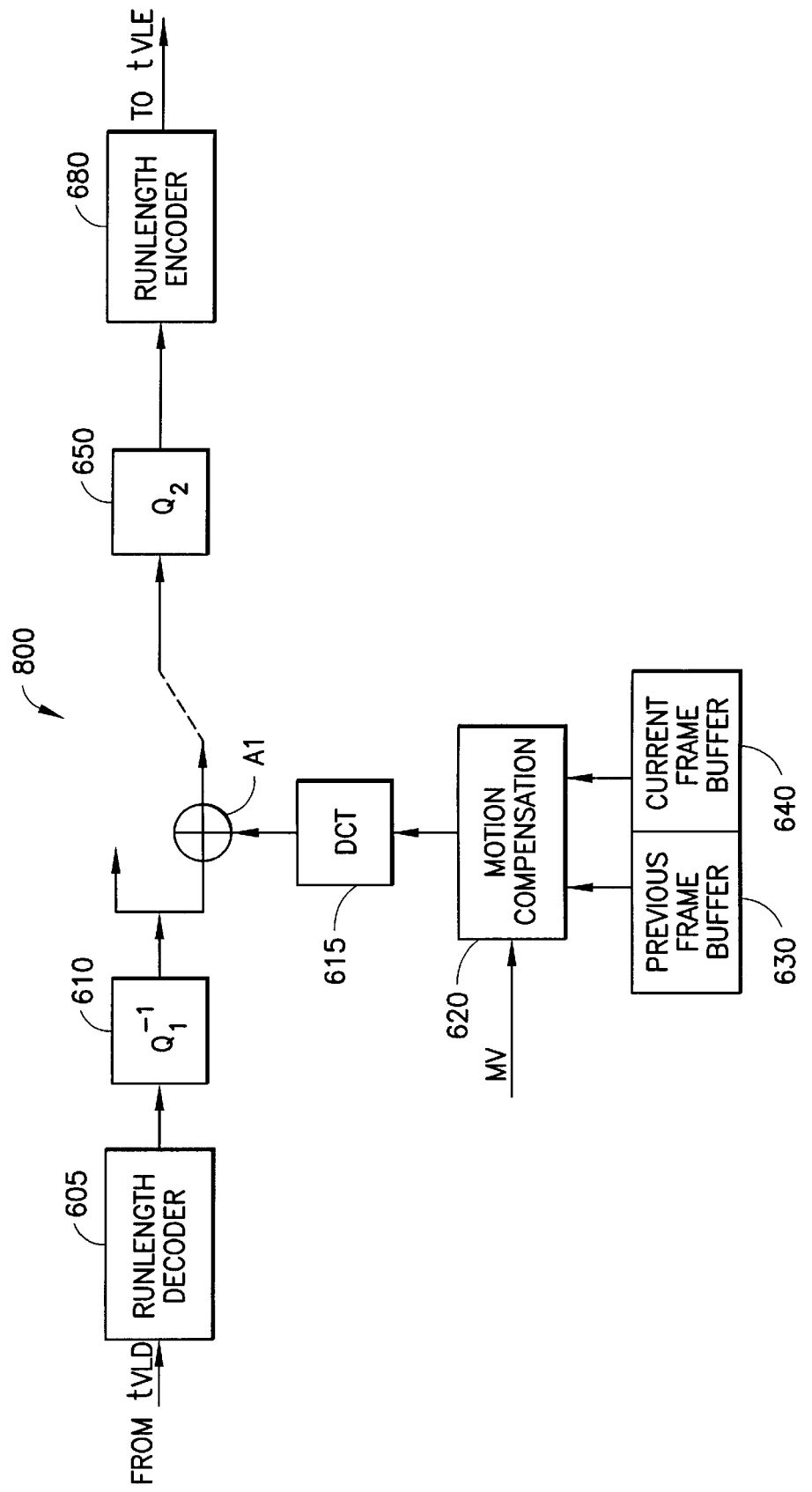
FIG. 8 illustrates the function blocks of the transcoder of FIG. 6 when coding inter-blocks in a B-picture.

2) B-picture, inter-block. FIG. 8 illustrates the function blocks of the transcoder of FIG. 6 when coding inter-blocks in a B-picture. Since a B frame is not an anchor frame, there is no need to output a spatial difference frame, so we obtain computational savings as follows: The update of buffer C_FB 640 can now be saved. Also, as shown in the transcoder 800 of FIG. 8, operations for the functions $Q_2^-$, IDCT, and A2 are all saved.

Figure 9:
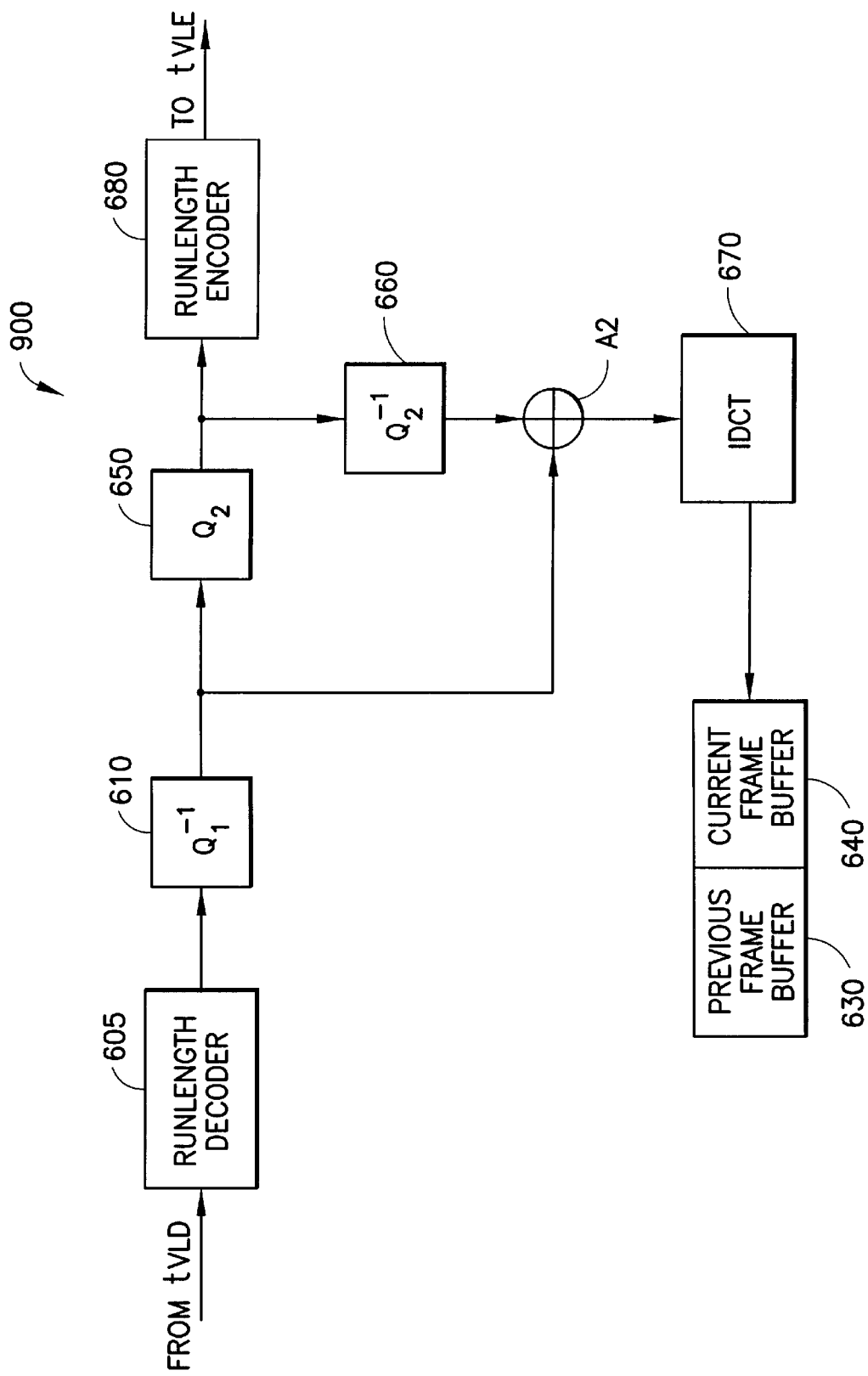
FIG. 9 illustrates the function blocks of the transcoder of FIG. 6 when coding intra-blocks in a non-B-picture, where $Q_2 > Q_1$.

3) Non-B picture, intra block, where $Q_2 > Q_1$. For intra blocks in I and P frames, no motion compensation is needed. FIG. 9 illustrates the function blocks of the transcoder of FIG. 6 when coding intra-blocks in a non-B-picture, where $Q_2 > Q_1$. As shown for the transcoder 900, operations for A1, DCT and MC at the decoder part are saved. Other savings in this case are that the IDCT at the encoder part is no longer needed. The output from $Q_1^{-1}$ 610 is directly fed into $Q_2$ 650.

Figure 10:
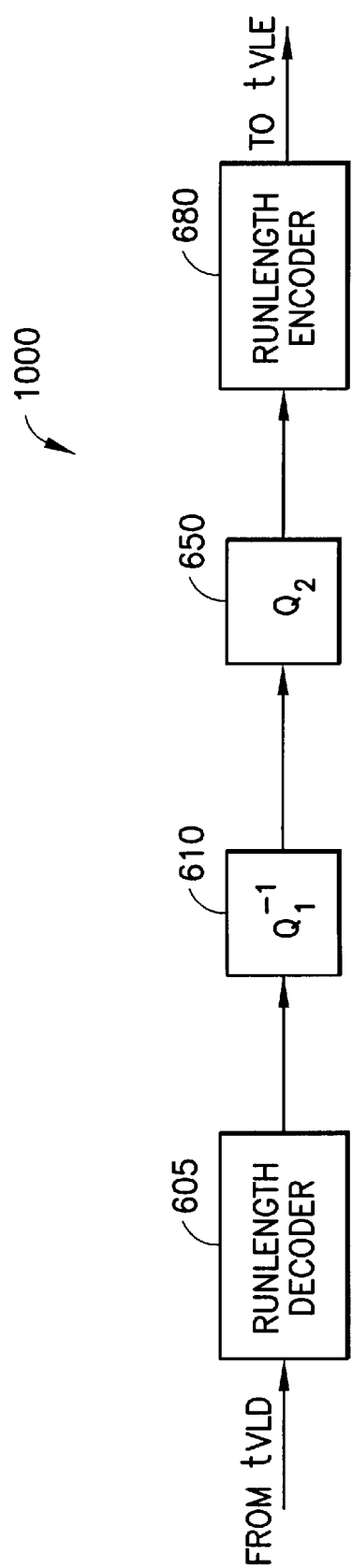
FIG. 10 illustrates the function blocks of the transcoder of FIG. 6 when coding intra-blocks in a B-picture, where $Q_2 > Q_1$.

4) B-picture, intra block, where $Q_2 > Q_1$. FIG. 10 illustrates the function blocks of the transcoder of FIG. 6 when coding intra-blocks in a B-picture, where $Q_2 > Q_1$. This case is relatively simple. Since it is an intra block, no motion compensation and DCT are needed in the transcoder 1000. IDCT is also omitted.

5) Non-B picture, intra block, with $Q_2 \leq Q_1$. FIG. 11 illustrates the function blocks of the transcoder of FIG. 6 when coding intra-blocks in a non-B-picture, where $Q_2 \leq Q_1$. Note that $Q_2$ might be calculated as being less than $Q_1$, in which case the macroblocks are passed through without being re-quantized, since the transcoder only provides bit rate reductions.

In this case, since it is an intra block and there are no quantization changes, no motion compensation, $Q_2$, $Q_2^{-1}$, and DCT are needed in the transcoder 1100. IDCT is also omitted.

6) B-picture, intra-blocks, where $Q_2 < Q_1$. FIG. 12 illustrates the function blocks of the transcoder of FIG. 6 when coding intra-blocks in a B-picture, where $Q_2 < Q_1$. This is the simplest case. The transcoder 1200 only uses the runlength decoder 605 and the runlength encoder 680.

Some special function blocks for the transcoding process are summarized below.

(1) For the input No-MC MBs in a P-picture, CBP could equal to zero after re-quantization. In this case:
  (a) a skipped MB is generated if this MB is not the first or the last MB in a slice;
  (b) a forward frame-predicted MB with a zero motion-vector is generated if this MB is the first or last MB in a slice.

(2) No DC prediction is performed in the transcoding process of a B-picture.

(3) For skipped MBs in a P-picture, the DMA engine is used in moving reference data from P_FB 630 to C_FB 640.

(4) For a frame-predicted MB with a zero motion vector (P-picture) or zero differential motion-vectors (B-picture) and the same prediction type of the previous MB, CBP could equal to zero after re-quantization. In this case, a skipped MB is generated if this MB is not the first or last MB in a slice.

The transcoder uses the DMA engine in the following data transfers: (1) iMB to Data Cache; (2) iBlk to Data Cache; (3) frame buffers (forward and backward references for prediction) to Data Cache; (4) Data Cache to C_FB frame buffer; (5) Data Cache to oMB; (6) Data Cache to oBlk; and (7) P_FB to C_FB (for skipped MBs in P-pictures)

4.2.7 Error handling

Errors in the input video are detected by tVLD and transcoding program. Errors fall into two categories:
(1) minor: which are often continuable at the next slice, and
(2) severe: the program has to continue at the next video sequence header.

Minor errors are continued at the next slice of the picture. These are denoted by isolated MB ERROR in MbData_t flow. The transcoding program "skips" MB_ERROR MBs (not passed to tVLE) and continues at the next good MB of the picture. A severe error, indicted by the PX_ERROR bit, results in the broken picture being discarded and Demuxo must resume by finding a new sequence header. The severe error state is maintained by each processing module independently and will result in removing all picture structures until a picture tagged with a video sequence startcode (and no severe error state) is found. A PX_ERROR picture is passed to Transcode(), where all MbData_t or BlkData_t generated for that picture is abandoned.

Some detailed procedures are as follows:
1) Most syntax and semantic error conditions of above the slice layer are not checked except for the following, which set the PX_ERROR bit in pict flags.

The picture type code is not 1, 2 or 3 (no MBs are processed).

1 or more fcodes==0 (no MBs are processed).

picture_structure is 0 (no MBs are processed)

No picture header seen before 1st slice (no MBs are processed).

decreasing slice vertical position in picture garbage detected between slices

2) The following macroblock level error conditions are detected and result in the MB_ERROR bit being set in MbData_t.

Zero value quantizer scale code (in MB or slice)

Zero valued {frame,field}_motion_code

More than 64 coefficients in a block

Invalid macroblock address increment VLC

Invalid macroblock type VLC

Invalid motion vector code VLC

Invalid coded block pattern VLC

Invalid run/level VLC

A picture (or higher level) error detected before processing any MBs results in an abort when the first slice SC is seen. PX_ERROR will be set, .u.vld.nblock==0==.u.vld.nmb, .u.vld.ending_startcode will be the first slice startcode. The ".u.vld" terms denote a C programming language syntax that references elements of the VLx_state_t data structure, e.g., as shown in Table 5. A macroblock level error will result in MB_ERROR set in the MbData_t structure for that MB, followed by a scan for the next startcode. If this SC is a slice startcode with a vertical position not smaller than that of the last slice processed, then MB decoding continues.

If MB error recovery startcode scan finds a non-slice start code, then picture processing is terminated with PX ERROR set (.u.vld.nmb and .u.vld.nblock indicate the number of MBs/Blks processed, respectively, inclusive of the last MB with MB_ERROR set). .u.vld.ending_startcode contains the non-slice startcode found. If MB error recovery startcode scan finds a slice startcode with a lower vertical position than the last slice processed, the input is scanned for the next non-slice startcode, PX_ERROR is set, .nmb/.nblock return the number of MBs/Blks processed, and .ending_startcode contains the non-slice startcode found.

When an error occurs, .u.vld.nmb, .u.vld.nblock, .hisyntax_bytes will correctly specify the number of header bytes, blocks and macroblock output. In the event of a macroblock level error, some of the bits in the CBP field of the last/errored may be cleared. The surviving 1 bits indicate the number of valid blocks output. This means that intra macroblock may have less than 6 valid blocks (if MB_ERROR is present).

4.2.8 Remux

The remux module 336 regenerates the PES and MTS layer syntax using information saved in the picture structure (for video) or aud_delay FIFO. The interleaving of packets of audio and video for the various services transcoded by this TPE must be consistent with the T-STD model described in MPEG systems (ISO/IEC 13818-1). Time stamps are generated based on a constant delay model for the Transmux system.

For video, coded picture data can be obtained from two possible sources, the oRB rate buffer if the picture has been transcoded, or from the iRB rate buffer if the picture is being bypassed (see below).

The computational process of remultiplexing involves using the DMA engine to read the input elementary stream data into cache to be encapsulated by PES and MTS syntax. The DMA engine is used to store the output MTS data into the PCIout buffer. PTS and DTS timestamps are locally computed. The output PTS is equal to the input PTS plus a constant. The output DTS is a linear function of a virtual oRB buffer occupancy. DTS calculation involves updating the virtual oRB occupancy with the bypass picture size. A "virtual" occupancy is used because transcoded pictures are not produced (stored in oRB) on the schedule required by T-STD, and bypass mode pictures are not modeled in the actual oRB occupancy. The PCRs are modified by the MUX processor to reflect the final level of multiplexing needed to produce the output transport stream.

4.2.9 Rate Control and QL Processor Communication

To determine the relative complexity of the coded video services, the QL processor requires the picture size and the sum of the quantizer values (not quantizer codes) for each picture. Remux determines the picture size (elementary stream bytes) and tVLD accumulates the sum of the number of quantizer values, the number of coded macroblocks, and the number of coded blocks in each picture. These quantities must be sent to the QL processor five frames in advance of the picture being transcoded. The look-ahead requirement is implemented by large iMB and iBlk FIFOs, and by not scheduling the transcoding of a picture until the five frame periods have elapsed since the completion of tVLD. The message containing the picture type and metrics is sent to QL from the BSP context switch path ISR following tVLD completion.

The QL processor 246 returns target rate information for use in the transcoding process. The target rate information is converted to target bits per slice, using the same relative distribution of bits as seen in the input pictures. The initial guess for the quantization level is based on a multiplicative scaling of the quantizer value by the ratio of the input picture size to the output picture size. The number of bits produced for each slice is monitored (using MB_SYNCHRONIZE) during transcoding, and a feedback process adjusts the quantizer scaling ratio by comparing the input and output slice sizes. Separate scaling ratios are kept for each picture type for each service. The cumulative surplus or deficit (actual bits minus target bits) is carried forward to the next picture of the service.

More precisely, $$q\_out[i]=q\_in[i]*alpha*(P\_in/P\_target)$$

where:

q_out[i] is the output quantization level of macroblock i, q_in[i] is the input quantization level of macroblock i, P_in is the size in bits of the picture being transcoded excluding picture layer and higher syntax, and P_target is the output target size in bits of the picture being transcoded from the QLP excluding picture layer and higher syntax.

There is a separate value of alpha for each picture type (I, P and B). The value of alpha is initialized to 1.0, for each picture type at startup. After each slice is encoded (size is obtained from the tVLE), alpha is updated as follows:

$$alpha=alpha*(P\_in/P\_target)*(S\_out/S\_in),$$

where S_out is the cumulative output picture size (excluding headers) through the end of the current slice, and S_in the sum of the slice sizes of the corresponding input slices. Note that the value of alpha is not reset between pictures.

One special case occurs when the target output size of a picture exceeds the input size. In this case, the coded input representation of the picture is output unchanged, bypassing transcoding and tVLE. Remux consumes the unchanged picture directly from the iRB in this case (iRB must be large enough for 2 VBV delays plus the lookahead period plus the computational delay). When bypass mode is used, the cumulative spatial error is either zeroed, copied forward (by fwd/bak buffer swapping) or not used, depending on whether the input picture type is I, P or B.

Accordingly, it can be seen that the present invention provides a transcoding apparatus and method. The apparatus includes at least a first transcoder processing element (TPE) for receiving a transport stream of input channels of compressed digital video data. A first processing resource, such as a co-processor, is associated with the first TPE, and provides de-assembly (e.g., VLD) and re-assembly (e.g., VLE) of the input channels at an elementary stream level.

A second processing resource, such as a VLIW media processor, performs transcoding of the elementary streams, and provides de-assembly and re-assembly of the input channels at a transport stream level. In particular, the VLIW core handles transport stream demultiplexing (before VLE) and remultiplexing (after VLE). The re-multiplexing function is partially handled by the TPE [e.g., MTS and PES packetization, PTS and DTS time stamps] and partially handled by the MUX processor [e.g., PCR timestamps] (see FIG. 2).

The first and second processing resources are operable in parallel, at least in part, to optimize the transcoder's throughput and balance the processing load between the two processors.

Moreover, a software architecture for implementing the transcoder is provided.

Although the invention has been described in connection with various specific implementations, it should be appreciated that various adaptations and modifications can be made thereto without departing from the scope of the invention as set forth in the claims.

What is claimed is:

1. A transcoder apparatus, comprising:
   at least a first transcoder processing element (TPE) for receiving input channels of a transport stream comprising compressed digital video data; and
   first and second processing resources associated with the first TPE for providing data de-assembly, core transcoding, and data re-assembly;
   a queue associated with the first processing resource for queuing data received from the second processing resource prior to processing at the first processing resource; and
   a queue associated with the second processing resource for queuing data received from the first processing resource prior to processing at the second processing resource; wherein:
   the first and second processing resources are operable in parallel, at least in part, for providing the data de-assembly, core transcoding, and data re-assembly.

2. The apparatus of claim 1, wherein:
   the first and second processing resources provide de-assembly of the transport stream to provide elementary stream data, de-assembly of the elementary stream data, including variable length decoding, to provide variable length decoded data, core transcoding of the variable length decoded data to provide core transcoded data, re-assembly of the core transcoded data to provide transcoded elementary stream data, and re-assembly of the transcoded elementary stream data to provide data for forming an output transport stream.

3. The apparatus of claim 1, further comprising:
   means for bypassing the core transcoding of at least one macroblock of the input channels when at least one of the first and second processing resources experiences a specified high computational load.

4. The apparatus of claim 1, wherein:
   the core transcoding comprises at least requantization of the input channels.

5. The apparatus of claim 1, wherein:
   the first processing resource comprises a Very Long Instruction Word (VLIW) processor.

6. The method of claim 1, wherein:
   the second processing resource comprises a co-processor of the first processing resource.

7. The apparatus of claim 1, further comprising:
   means for minimizing a computational load of at least one of the first and second processing resources according to a picture type, macroblock type, and input/output quantization levels of at least one of the input channels.

8. The apparatus of claim 1, further comprising:
   additional transcoder processing elements (TPEs), each for receiving an associated plurality of input channels of a transport stream comprising compressed digital video data;
   first and second processing resources associated with each of the additional TPEs for providing data de-assembly, core transcoding, and data re-assembly;
   for each additional TPE, a queue associated with the first processing resource for queuing data received from the second processing resource prior to processing at the first processing resource; and
   for each additional TPE, a queue associated with the second processing resource for queuing data received from the first processing resource prior to processing at the second processing resource; wherein:
   for each additional TPE, the first and second processing resources are operable in parallel, at least in part, for providing the data de-assembly, core transcoding, and data re-assembly.

9. The apparatus of claim 1, further comprising:
   a software-implemented architecture for use with the transcoder processing element (TPE), first processing resource, and second processing resource.

10. The apparatus of claim 1, wherein:
    the first and second processing resources are provided on a common chip.

11. The apparatus of claim 1, wherein
    the transcoder processing element performs full transcoding on the input channels, including keeping track of frame-to-frame requantization errors.

12. The apparatus of claim 1, further comprising:
    means for communicating with a quantization level processor that is external to the first and second processing resources to provide statistical multiplexing of multiple transcoded video services that are provided, at least in part, by the first and second processing resources.

13. The apparatus of claim 1, further comprising:
    means for balancing a processing load between the first and second processing resources.

14. The apparatus of claim 1, wherein:

the transcoding of the input channels is adjusted to reduce a computational load thereof according to a current picture type.

15. The apparatus of claim 1, wherein:

the transcoding of the input channels is adjusted to reduce a computational load thereof according to whether a current macroblock coding type is intra-coded or inter-coded.

16. The apparatus of claim 1, wherein:

the transcoding of the input channels is adjusted to reduce a computational load thereof according to whether a quantization step size of a current picture increases or decreases during transcoding.

17. The apparatus of claim 1, further comprising:

means for bypassing the core transcoding of at least one picture of the input channels when at least one of the first and second processing resources experiences a specified high computational load.

18. The apparatus of claim 1, wherein:

the first processing resource provides de-assembly of the transport stream to provide elementary stream data;

the second processing resource provides de-assembly of the elementary stream data, including variable length decoding, to provide variable length decoded data;

the first processing resources performs core transcoding of the variable length decoded data to provide core transcoded data;

the second processing resource provides re-assembly of the core transcoded data to provide transcoded elementary stream data; and the first processing resource provides re-assembly of the transcoded elementary stream data to provide data for forming an output transport stream.

19. The apparatus of claim 18, wherein:

the first and second processing resources are operable in parallel, at least in part, such that the first processing resource provides at least one of: (a) said de-assembly of the transport stream, (b) said core transcoding of the variable length decoded data, and (c) said re-assembly of the transcoded elementary stream data, for at least one of the input channels, while the second processing resource provides at least one of: (d) said de-assembly of the elementary stream data, and (e) said re-assembly of the core transcoded data, for at least one other of the input channels.

20. The apparatus of claim 1, further comprising:

a scheduling resource associated with the first transcoder processing element for providing scheduling of multiple transcoding threads.

21. The apparatus of claim 20, wherein:

the multiple transcoding threads include buffer management.

22. The apparatus of claim 20, wherein:

the multiple transcoding threads include processor management.

23. The apparatus of claim 20, wherein:

the scheduling resource provides scheduling of the multiple transcoding threads with combinations of both transcoded video and pass-through data/audio services.

24. The apparatus of claim 20, wherein:

the scheduling resource provides scheduling of the multiple transcoding threads with combinations of both transcoded video and pass-through data/audio services on a single processor without the use of a real-time operating system.

25. The apparatus of claim 1, wherein:

an average number of processing cycles per picture is specified for pictures of the input channels; and a number of processing cycles used by at least one of the first and second processing resources is permitted to vary from the average by a specified amount.

26. The apparatus of claim 1, wherein:

at least one of the first and second processing resources is permitted to meet an average number of processing cycles per picture for pictures of the input channels by averaging the processing cycles used for pictures of different ones of the input channels.

27. A transcoding method, comprising the steps of:

receiving input channels of a transport stream comprising compressed digital video data at at least a first transcoder processing element (TPE); and providing data de-assembly, core transcoding, and data re-assembly at first and second processing resources associated with the first TPE;

providing a queue associated with the first processing resource for queuing data received from the second processing resource prior to processing at the first processing resource; and providing a queue associated with the second processing resource for queuing data received from the first processing resource prior to processing at the second processing resource; wherein:

the first and second processing resources are operable in parallel, at least in part, for providing the data de-assembly, core transcoding, and data re-assembly.

* * * * *